US008473420B2

(12) United States Patent (10) Patent No.: US 8,473,420 B2
Bohus et al. (45) Date of Patent: Jun. 25, 2013

(54) COMPUTATIONAL MODELS FOR SUPPORTING SITUATED INTERACTIONS IN MULTI-USER SCENARIOS

(75) Inventors: Dan Bohus, Kirkland, WA (US); Eric Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 12/492,812

(22) Filed: Jun. 26, 2009

(65) Prior Publication Data

US 2010/0332648 A1 Dec. 30, 2010

(51) Int. Cl.
 *G06Q 10/00* (2012.01)
(52) U.S. Cl.
 USPC ............ 705/319; 704/275; 340/541; 345/419
(58) Field of Classification Search
 USPC ............... 704/275; 340/541; 345/419; 705/1, 705/319
 See application file for complete search history.

(56) References Cited

U.S. PATENT DOCUMENTS

| 6,721,706 | B1 * | 4/2004 | Strubbe et al. ................. 704/275 |
| 2002/0015037 | A1 * | 2/2002 | Moore et al. ................... 345/419 |
| 2005/0088981 | A1 | 4/2005 | Woodruff et al. |
| 2006/0093998 | A1 | 5/2006 | Vertegaal |
| 2008/0130956 | A1 * | 6/2008 | Jordan et al. ................... 382/115 |
| 2009/0092283 | A1 * | 4/2009 | Whillock et al. ............. 382/103 |
| 2009/0153325 | A1 * | 6/2009 | Birtcher et al. ............... 340/541 |

OTHER PUBLICATIONS

Thorisson, Kristinn R. "Natural Turn-taking Needs No Manual: Computational Theory and Model, from Perception to Action". Multimodality in Language and Speech Systems, 173-207. The Netherlands: Kluwer Academic Publishers, Dordrecht, 2002.*
Sabarish Venkat Babu. "Inter-personal social Conversation in Multimodal Human-Virtual Human Interaction". The University of North Carolina at Charlotte, 2007.*
Larsson, Staffan, "Issue-Based Dialog Management", Department of Linguistics Göteborg University, Sweden 2002, http://www.ling.gu.se/~sl/Thesis/thesis.pdf.
Ferguson et al., "TRIPS: An Intelligent Integrated Problem-Solving Assistant", 1998, American Association for Artificial Intelligence, http://www.cs.rochester.edu/research/cisd/pubs/1998/ferguson-allen-aaai98.pdf.
Rich et al., "Collagen: Applying Collaborative Discourse Theory to Human-Computer Interaction", Mitsubishi Electric Research Laboratories, Inc., 2000, http://reference.kfupm.edu.sa/content/c/o/collagen_applying_collaborative_discour_79826.pdf.

(Continued)

*Primary Examiner* — Gabrielle McCormick
(74) *Attorney, Agent, or Firm* — Microsoft Corporation

(57) ABSTRACT

Individuals may interact with automated services as one or more parties, where such individuals may have collective (as well as individual) intents. Moreover, parties may concurrently communicate with the interface, and the interface may have to manage several concurrent interactions with different parties. Single-individual interfaces may be unable to react robustly to such dynamic and complex real-world scenarios. Instead, multi-party interfaces to service components may be devised that identify individuals within a scene, associate the individuals with parties, track a set of interactions of the parties with the service component, and direct the service component in interacting with the parties. A multi-party interface may also detect and politely handle interruptions, and may identify information items about individuals and parties based on context and history, prioritize the intents of the individuals and parties, and triage interactions accordingly.

20 Claims, 12 Drawing Sheets

OTHER PUBLICATIONS

Sidner et al., "Engagement Rules for Human-Robot Collaborative Interactions", Mitsubishi Electric Research Laboratories, Inc., 2003, http://www.merl.com/papers/docs/TR2003-50.pdf.

Horvitz, Eric, "Reflections on Challenges and Promises of Mixed-Initiative Interaction", AAAI Magazine 28, Special Issue on Mixed-Initiative Assistants (2007), http://research.microsoft.com/en-us/um/people/horvitz/mixed_initiative_reflections.pdf.

Raux, Antoine, "Flexible Turn-Taking for Spoken Dialog Systems", Language Technologies Institute, CMU Dec. 12, 2008, http://www.google.com/url?sa=t&source=web&ct=res&cd=8&url=http%3A%2F%2Fwww.cs.cmu.edu%2F~antoine%2Fdefense_antoine.ppt&ei=n3H4SYGUJqXu6gPgqpGDAg&usg=AFQjCNFIGWgQFbVp-BvNQu8f1P6-zx9rGIA.

Fried, Ina, "Microsoft Demos Robotic Receptionist", Jul. 24, 2008, http://news.cnet.com/8301-13860_3-9999057-56.html.

Michalowski, et al., "A Spatial Model of Engagement for a Social Robot", 2006, pp. 762-767, http://ieeexplore.ieee.org/stamp/stamp.jsp?tp=&arnumber=1631755&isnumber=34213.

Webber et al., "Instructions, Intentions and Expectations", Artificial Intelligence 73, 1995, pp. 253-269, http://www.sciencedirect.com/science?_ob=Mlmg&_imagekey=B6TYF-4002FNS-8-1&_cdi=5617&_user=10&_orig=search&_coverDate=02%2F28%2F1995&_sk=999269998&view=c&wchp=dGLzVtb-zSkWA&md5=8a8614f7eb82437e42d67b91938c7f32&ie=/sdarticle.pdf.

Mott et al., "U-Director: A Decision-Theoretic Narrative Planning Architecture for Storytelling Environments", May 8-12, 2006, Hakodate, Hokkaido, Japan, http://www.bradfordmott.com/papers/crystal-island-aamas-06.pdf.

Traum, David, "Interactive Dialogue for Simulation with Virtual Characters", pp. 1-24, graphics.usc.edu/~suyay/class/Slides/CS597-10-23-06.ppt.

Pfleger, et al., "A Comprehensive Context Model for Multi-party Interactions with Virtual Characters", 2006, pp. 157-168, http://www.springerlink.com/content/h79271783j448622/.

Grothendieck et al., "Social Correlates of Turn-Taking Behavior", 2009, http://www.nashborges.com/research/sctt_icassp09.pdf.

Basu, Sumit, "Conversational Scene Analysis", Massachusetts Institute of Technology, 2002, http://alumni.media.mit.edu/~sbasu/papers/thesis.pdf.

Acero, et al., "Live Search for Mobile: Web Services by Voice on the Cellphone", 2008, pp. 5256-5259, http://research.microsoft.com/pubs/78782/2008-geoff-icassp.pdf.

Clark et al., "Contributing to Discourse", Stanford University, 1989, pp. 259-294, http://www-psych.stanford.edu/~herb/1980s/Clark.Schaefer.89.pdf.

Sacks et al., "A Simplest Systematic for the Organization of Turn-Taking for Conversation", Language, vol. 50, No. 4, Part 1, Dec. 1974, pp. 696-735, http://www.liso.ucsb.edu/Jefferson/Systematics.pdf.

Thorisson, Kristinn R., "A Mind Model for Multimodal Communicative Creatures and Humanoids", International Journal of Applied Artificial Intelligence, 1999, vol. 13 (4-5), 449-486, http://xenia.media.mit.edu/~kris/ftp/IJAAI.pdf.

Raux, et al., "Optimizing Endpointing Thresholds using Dialogue Features in a Spoken Dialogue System", Proceedings of the 9th SIGdial Workshop on Discourse and Dialogue, pp. 1-10, Columbus, Jun. 2008, http://www.aclweb.org/anthology-new/W/W08/W08-0101.pdf.

Thorisson, Kristinn R. "Natural Turn-Taking Needs No Manual: Computational Theory and Model, from Perception to Action", Multimodality in Language and Speech Systems, pp. 173-207, 35 Pages http://xenia.media.mit.edu/~kris/ftp/CompModTurnTak.pdf, 2002.

Horvitz, et al. "A Computational Architecture for Conversation" http://research.microsoft.com/en-us/um/people/horvitz/ftp/converse.pdf In: Proceedings of the Seventh International Conference on User Modeling, Banff, Canada, Jun. 1999. New York: Springer Wien, pp. 201-210 pp. 1-10.

"Introducing Angela", AngelSpeech, Inc., http://www.angelspeech.com/index.html Date: Mar. 15, 2008. pp. 1-3.

Bohus, Dan., "Situated Interaction Project Page", http://research.microsoft.com/en-us/um/people/dbohus/research_situated_interaction.html Dated: Mar. 1, 2009 pp. 1-3.

"V-Lingo Mobile", Vlingo Proprietary & Confidential, User Interfaces 1.3 http://www.vlingo.com/ Date: Jan. 6, 2009 pp. 1-8.

Johnston, et al., "Matchkiosk: A Multimodal Interactive City Guide", http://www.aclweb.org/anthology-new/P/P04/P04-3033.pdf In: Association of Computational Linguistics ACL 2004, Barcelona, pp. 223-226 (2004) pp. 1-4.

Gustafson, et al., "The August Spoken Dialogue System", http://www.ida.liu.se/~ssomc/papers/Gustafsson.pdf In Proceedings of Eurospeech'99, pp. 1151-1154. Published Year: 1999 pp. 1-3.

Cassell, et al. "Embodiment in Conversational Interfaces: Rea", http://www.ccs.neu.edu/home/mayuresh/PPT/cassell99.pdf In CHI '99: Proceedings of the SIGCHI conference on Human factors in computing systems (1999) Date: May 15-20, 1999 pp. 1-8.

Cole, Ronald. "Tools for Research and Education in Speech Science", http://citeseerx.ist.psu.edu/viewdoc/summary?doi=10.1.1.20.6023 In Proceedings of the International Conference of Phonetic Sciences, San Francisco, CA. Date: Aug. 1999. Center for Spoken Language Understanding, Univ. of Colorado, Boulder. pp. 1-5.

* cited by examiner

COMPUTATIONAL MODELS FOR SUPPORTING SITUATED INTERACTIONS IN MULTI-USER SCENARIOS

BACKGROUND

Many computing scenarios arise where a computational system may interact with one or more individuals, who may request various services provided by the system through many types of human/computer interfaces. For example, an automated system may listen to natural language speech from a user, and may endeavor to process the natural language input to identify and fulfill various requests. When the interaction with the user is complete, the automated system may await input from an additional user, and may therefore service a series of individual users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In many scenarios involving the collaboration of people with one another, people recognize and coordinate with multiple people who may have different relationships and roles. Often, contextual cues, locomotive trajectories, relative positions, poses, attention, gaze, utterances, and gestures may be significant in understanding roles, goals, and the intents of one or more parties, and such observations and inferences may be useful for coordinating and collaborating in an effective and elegant manner. However, computer systems that service individual users in series may be poorly equipped to evaluate real-world situations in which individuals dynamically form parties, and who may attempt to interact with the computer system in an informal and uncoordinated manner, while perhaps also interacting with each other.

As a first example, a number of individuals may approach the computer system in a short timeframe, and it may be up to the computer system to identify the relationships between the individuals based on contextual information, such as proximity, spatio-temporal trajectories, mutual attention, and conversations. As a first such scenario, a mother with an ill child may approach a medical kiosk, carrying the child or with the child in tow, and the kiosk may wish to engage both the mother and the child in an elegant dialog to probe the history and current symptomatology of the child's illness. As a second such scenario, a robotic home eldercare system may have to recognize and distinguish the human health professional who is engaging in care from the elder. As a third such scenario, two people may approach a digital receptionist with the ability to engage in spoken dialog at a building lobby and seek information on transportation or directions; the digital receptionist may seek to understand the relationships between the two people: e.g. are they peers, or is one a visitor and the other one their host? As a fourth scenario, an educational computer system might interact with a group of children to engage them in a cooperative or competitive learning game, or to simply tutor them on a specific subject (e.g. math, physics, history, etc.); such a system might seek to understand which children are trying to dominate the game, and give others an opportunity to contribute. As these scenarios illustrate, the relationships between individuals that a computer system may seek to understand range from the relatively simple, e.g., "are these people in a group together?" to more complex, semantic or social relationships (e.g., caregiver vs. patient, visitor vs. host, dominant vs. dominated, etc.)

As a second example, the orderly pace and turn-taking protocol of natural conversation with a single user may be complicated by input from numerous individuals, communication from multiple individuals in the same party, interruptions, and distractions. For instance, two people approaching the aforementioned digital receptionist at the building for directions may interact separately or together with the computing system to inquire about directions as they also engage in conversation with one another on topics related and unrelated to the request for directions. As a third example, the computer system may have to identify a collective intent of a party and by the individuals thereof, and to prioritize such intents and triage interactions with interacting parties. For instance, in the digital receptionist example, a third person may appear to walk with the two individuals who jointly seek directions yet be approaching and waiting to engage the receptionist about another task, or may momentarily interrupt the existing conversation. In the learning game example, multiple children may respond simultaneously, overlapping with each other, and the computer system might endeavor to impose and regulate turn-taking.

The present disclosure addresses the challenge of endowing computing systems with the competency that might be expected in people for recognizing, communicating, and coordinating with multiple people and/or other computational agents to achieve one or more goals. Competencies involved in recognizing the intents, attention, roles, and relationships among individuals are not only useful in situations where a computing system is playing the role of a personified digital receptionist or robot, but may extend to a broad spectrum of applications and scenarios. The abilities to observe and understand multiple parties may be harnessed in numerous settings where machines interact with people and, increasingly, where machines interact with one another. Such applications include the extension of simple policies to more sophisticated, valuable behaviors, enabling machines to act with the awareness attributed to human intelligence in the past.

In view of these complexities and opportunities for enhanced automated services, a computer system may be developed to manage the interactions of a set of individuals with a service component, which may be configured to provide a set of services to individuals. The computer system may be devised to identify the individuals within a scene, and to assign such individuals to parties based on contextual factors. The computer system may also track the attention of each individual and the engagement of the parties with the computer system, and to manage interactions with the parties, such as initiating and maintaining an interaction, pacing and planning of conversation, and handling interruptions by various individuals. The computer system may also deduce information about each individual and party based on the conversation, contextual factors such as appearance, objects carried, spatio-temporal trajectory, proximity, pose, eye gaze, sustained attention, gestures, and the history of the individual during previous interactions; in addition to facilitating the services provided by the service component, this information may promote the interaction with the individual and party. These capabilities may permit the computer system to interact more adeptly and naturally with individuals in real-world scenarios, thereby leading to a more effective, efficient, helpful, and pleasant interactive experience.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
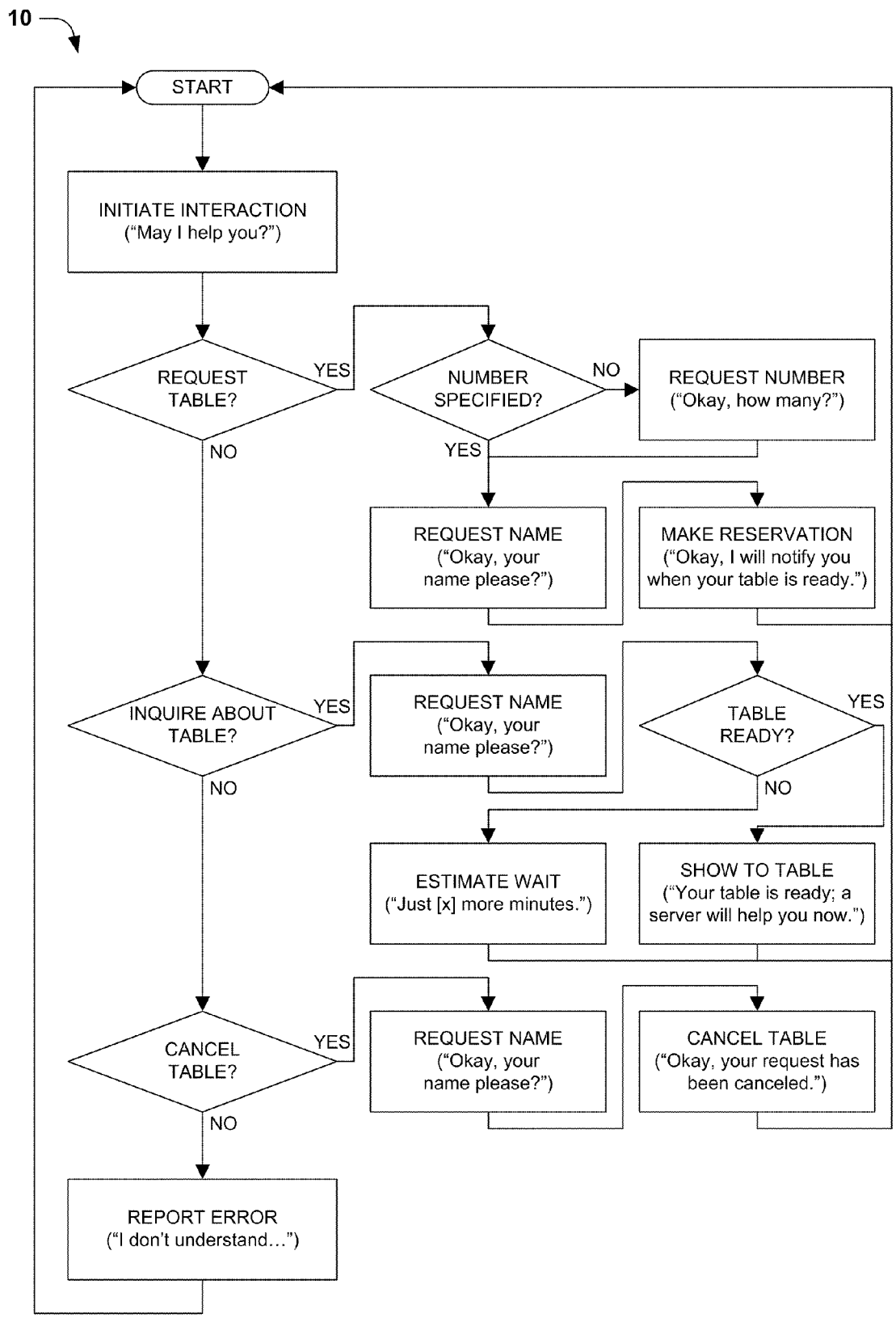
FIG. 1 is an illustration of an exemplary knowledge system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many real-world computing scenarios involve an interaction of a computer with an individual who wishes to request and receive services. This class of computer systems may be viewed as a service component that has access to a set of resources, that safeguards or regulates access to these resources through a business logic, and that communicates with a user who wishes to access such resources in a particular scenario. As a first example, an automated maître d' of a restaurant may interact with a user who wishes to inquire about the cuisine, request or change a reservation, place an order, or pay a bill. As a second example, an automated taxi service may facilitate a driver and passengers by accepting a destination, providing recommendations and information about locations, and settling a taxi fare. As a third example, a receptionist of a building may identify visitors, arrange appointments and conferences, and mediate access by guests to the building. Such service components may comprise a set of input components (e.g., keyboards and microphones); a set of output components (e.g., speakers and displays) and a service system that can accept various types of requests from the individual, apply a business logic to determine how such requests may be handled, and communicate to individuals the results of such business logic.

FIG. 1 presents an exemplary flowchart illustrating a simple knowledge system 10 that may be utilized by a service component that functions as a host in a restaurant, and that handles various requests for table reservations by patrons. The knowledge system 10 is capable of handling various requests, for asking pertinent follow-up questions in a conversational manner, and for performing various services, such as accessing and updating a table log that matches patrons with available tables. In this and other scenarios, the knowledge system 10 may interface with patrons through various interfaces, such as a menu system accessed via a touchpad or touchscreen interface or a natural-language parser having a language model that permits the interpretation of common requests in this exemplary scenario.

Contemporary systems for such scenarios often interact with individuals on a first-come, first-served basis. For example, a kiosk may operate in a passive or standby mode until activated by a user (e.g., by touching a touchscreen, speaking into a microphone or handset, or swiping a badge or fingerprint through a corresponding reader.) The kiosk may then initiate an interaction, such as by displaying a main menu or prompting the user to state a request, and may process subsequent input from the user through the business logic that safeguards access to the resources. When the interaction with the user is concluded (e.g., when the intent of the user is satisfied, or when the user abandons the interaction), the kiosk may reenter the passive or standby mode until activated by a subsequent user, and may then initiate a new interaction.

Figure 2:
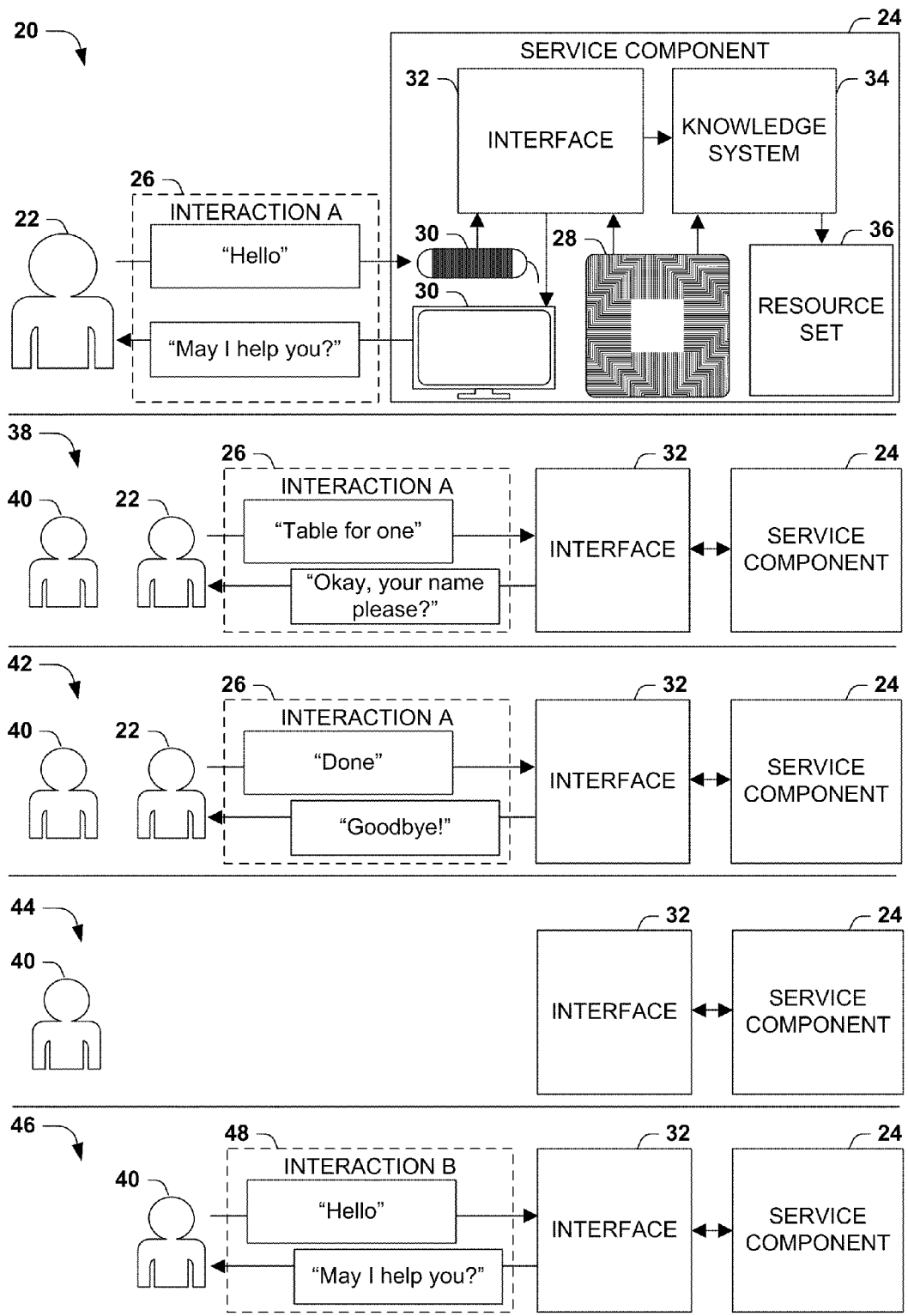
FIG. 2 is an illustration of an exemplary scenario featuring a servicing of individuals according to the exemplary knowledge system of FIG. 1 using a single-individual interface.

FIG. 2 presents an exemplary scenario, illustrated at various time points, between various individuals 22 and a service component 24. The service component 24 includes a knowledge system 34 (such as the exemplary knowledge system 10 of FIG. 1) that manages and regulates access to a resource set 36 (e.g., the table log for the restaurant.) The knowledge system 34 receives input, such as normalized requests, and delivers output, such as scripted responses, through an interface 32, which is configured to communicate with guests. The interface 32 in turn may communicate with a set of devices 30, including a microphone and a display, and may process the input and render output accordingly (e.g., by parsing spoken communications received from guests through the microphone according to a natural-language processor, based on a language model that parses common queries in the exemplary scenario of the knowledge system 34, and by rendering the output of the knowledge system 34 as text on the display. Finally, the service component 24 may comprise a processor 28, which may execute portions of the interface 32 and/or the knowledge system 34 that are encoded as processor-executable instructions.

At the beginning of the exemplary scenario of FIG. 2, the service component 24 may be idle, awaiting a beginning of an interaction with an individual. At a first time point 20, an individual 22 may initiate an interaction 26 with the service component 24 through the interface 32. The knowledge system 34 may evaluate the input from the individual 22 received through the microphone, determine that the individual 22 wishes to initiate an interaction 26, and issue a responsive greeting on the display. At a second time point 38, the individual 22 may issue a natural-language request to the interface 32 as part of the interaction 26, such as a request for a reservation. The interface 32 may parse the request (e.g., a variety of semantically equivalent natural-language queries, such as "can I get a table?", "we need a table," and "table, please") and may deliver normalized input (e.g., "Request Table") to the service component 24 for processing through the knowledge system 34. If the request is found to be valid and satisfiable, the service component 24 may update the resource set 36 according to the request (e.g., by adding a reservation in a reservation set for the individual 22) and may notify the individual 22 through the interface 32, e.g., on the output device 30.

Also at the second time point 38 of FIG. 2, a second individual 40 may approach the service component 24, and may form a queue behind the first individual 22 while awaiting an opportunity to interact with the service component 24. At a third time point 42, the individual 22 may terminate the interaction 26 with the service component 24, e.g., by saying "Done," and the service component 24 may respond (through the interface 32) by terminating the interaction 26. At a fourth time point 44, the first individual 22 departs, and the service component 24 enters an idle state. At a fifth time point 46, the second individual 40 may take the opportunity to interact with the service component 24 that is now idle, and the service component 24 may initiate a second interaction 48 (through the interface 32) with the second individual 40. In this manner, the service component 24 may serve various individual 22 in series, whereby a first interaction 26 with a first individual 22 is initiated, processed through the knowledge system 34, and concluded before a second interaction 48 with a second individual 40 may be initiated. The interface 32 may facilitate the service component 24 by parsing input and rendering output, thereby enabling the service component 24 to focus on applying the business logic of the knowledge system 32 to manage access to the resource set 36. Service components 24 and interfaces 32 that interact with individuals 22 as in the exemplary scenario of FIG. 2 may be easily designed, e.g., as a menu system or a natural language parser; may interact with individual 22 in many ways, e.g., by voice, text, or telephonic notepad; and may be used in a wide variety of service-oriented scenarios.

However, in many real-world scenarios, the service component 24 illustrated in FIG. 2 may be inadequate, inefficient, or frustrating to use in several aspects. Many interactions 26 with the service component 24 through an interface 32 may involve more than one individual 22 comprising a party. The individuals 22 may have a common intent as part of the party, but may also have separate intents 22, and multiple individuals 22 of the party may attempt to communicate with the service component 24 in sequence or even concurrently; they may also communicate with each other. Additionally, multiple parties may be present, and may attempt to communicate with the service component 24 concurrently. For example, a first party may temporarily suspend an interaction 26 with the service component 24 (e.g., during a side conversation), and a second party may attempt to interpose a brief interaction 26 with the service component 24 in the interim. These and other complications may arise from the multi-individual and multi-party nature of real-world scenarios, and a service component 24 that is not equipped to manage such interactions may be insufficient.

One such scenario involves the common experience with elevators, which typically involve the use of buttons to order elevators to schedule floors as destinations, and open and close doors, where, for example, timers and beam-breaking detectors are used to control how long elevator doors remain open. The operation of elevators can be extended by analysis of a scene external and/or internal to elevators. One or more parties may be viewed; their intents to use an elevator may be inferred; and elevators can be ordered and doors held elegantly and with etiquette when someone is at a distance or is involved in the finishing of a conversation, thereby avoiding the typical incidents of people running to catch the elevator, extending their arms to break beams or to even pushing buttons to order elevators to a floor. These ideas may be applied to control electric doors, which today often exhibit a great number of false positive openings when people are detected as being in proximity of a sensor. People and intelligent computational scene analyses and learning may identify that one or more people are walking past a door and not through the door entry, and may recognize spatio-temporal trajectories and the associated intents to pass by the door or use a door. Moreover, these inferences may be made in advance of when the inference might ordinarily be harnessed by the automated door system in making decisions. The techniques discussed herein may be developed and utilized to provide more adept, multi-party computer interfaces in many such scenarios.

Figure 3:
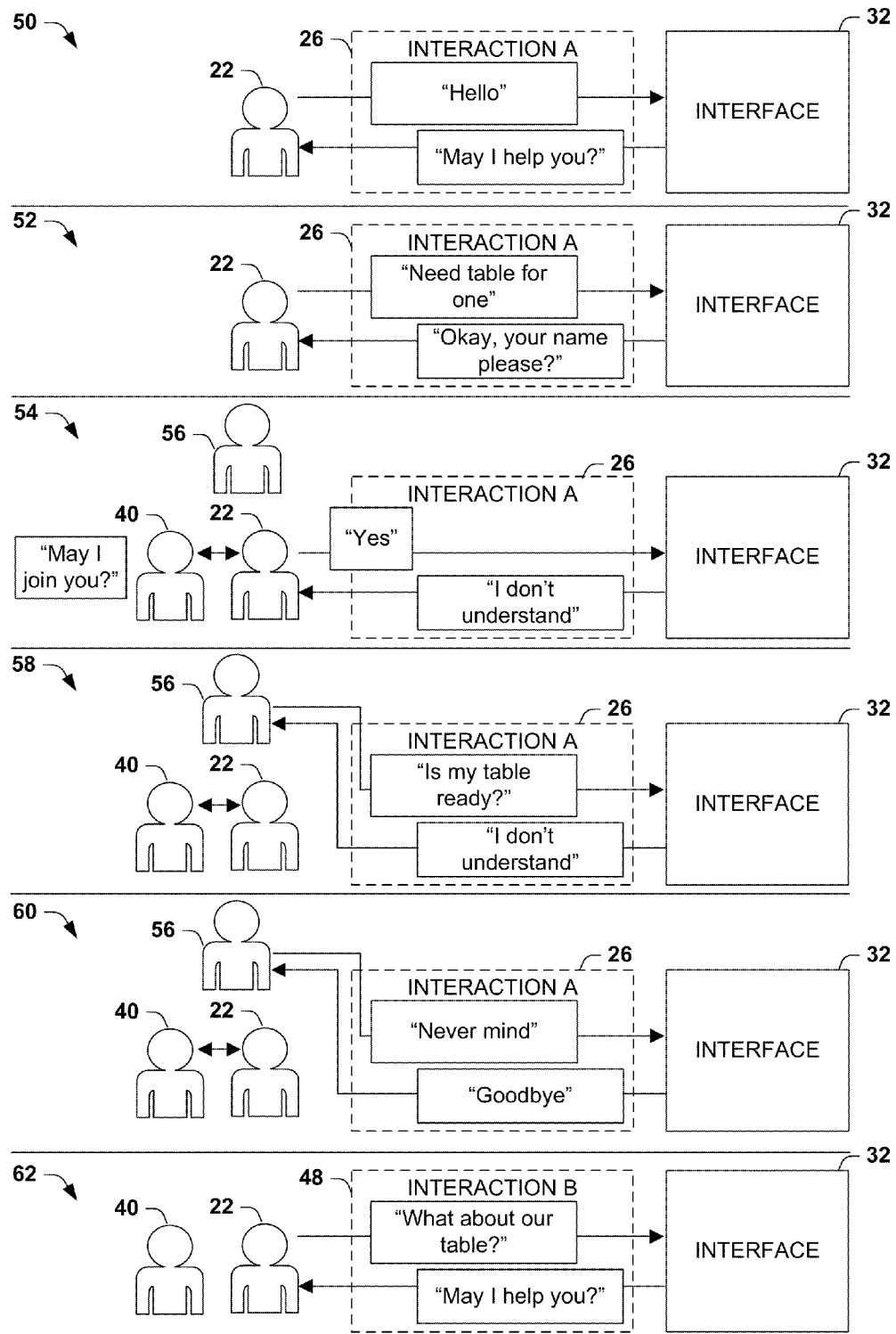
FIG. 3 is an illustration of another exemplary scenario featuring a servicing of individuals according to the exemplary knowledge system of FIG. 1 using a single-individual interface.

FIG. 3 presents a second exemplary scenario of interactions 26 of multiple individuals 22 with a service component 24 through an interface 32 that is configured to interact with single individuals 22. In this exemplary scenario, the service component 24 functions as a host that greets guests at a restaurant and assigns available tables, and the interface 32 interacts with one individual 22 at a time to provide access to the table allocating services. At a first time point 50, a first individual 22 approaches the service component 24 and speaks a greeting that is received by the interface 32, and the service component 24 therefore initiates a first interaction 26 with the first individual 22. At a second time point 52, the first individual 22 requests a table for one, and the service component 24 begins to fulfill the request. However, at the third time point 54, a second individual 40 approaches the first individual 22. As an acquaintance of the first individual 22, the second individual 40 requests to join the first individual 22 at the restaurant, and the first individual 22 accepts. However, the interface 32 is not equipped to identify a second individual 40 in the interaction 26, and the service component 24 is unable to handle the presence of the second individual 40 or the apparent relationship with the first individual 22. Moreover, the interface 32 may have overheard part or all of the conversation between the first individual 22 and the second individual 40, and may have received this conversation as voice input directed to the interface 32. As a result, the interface may present the received input to the service component 24, which may be unable to evaluate such input in the context of the interaction 26. The interface 32 may therefore report an inability to understand the perceived request of the first individual 22.

Additionally, at the third time point 54 of FIG. 3, a third individual 56 might also approach the service component 24 who is awaiting an availability of a previously requested table. At a fourth time point 58, while the first individual 22 and second individual 40 are engaged in a brief side conversation, the third individual 56 may interpose an inquiry to service component 24 (through the interface 32) about the previous request. However, the interface 32 does not identify that the request is being issued by someone other than the first individual 22 with whom the first interaction 26 is transpiring. The interface 32 therefore presents the input to the service component 24, which attempts to process the input by the third individual 56 as part of the first interaction 26, but finds this input inconsistent with the first interaction 26, and the interface 32 reports an unhelpful message to the third individual 56. At the fifth time point 60, the third individual 56 provides input to the interface 32 abandoning the inquiry and departs. The interface 32 duly presents the received input to the service component 24, which interprets this input as an abandonment of the first interaction 26. Consequently, when the first individual 22 resumes the interaction with the service component 24 regarding the table request, the service component 24 initiates a second interaction 48 without the information provided during the first interaction 26. The output presented by the interface 32, although a logical result of the application of the input received by the interface 32 through the knowledge system 34, may thereby confuse and frustrate the first individual 22.

The exemplary scenario of FIG. 3 illustrates several shortcomings of a single-individual interface 32 in a real-world scenario. As a first example, the interface 32 was unable to recognize the presence of the second individual 40 or the relationship between the second individual 40 and the first individual 22, and was unable to deduce that the request of the first individual 22 might be expanded to accommodate the second individual 40. Moreover, the interface 32 was unable to understand the context of the conversation between the first individual 22 and the second individual 40; and instead of applying the indirect request within this conversation to the previous request of the first individual 22, the interface 32 accepted the speech of the first individual 22 as input directed to the service component 24, which was inapplicable to the interaction 26. As a second example, the interface 32 was unable to distinguish the first individual 22 from the third individual 56, and failed to identify the inquiry of the third individual 56 as a separate interaction from the currently active first interaction 26. Moreover, the interface 32 failed to relate the inquiry of the third individual 56 to a recent interaction with the third individual 56, which may have occurred only a few moments before the first time point 50. As a third example, when the first individual 22 attempts to resume the first interaction 26 (perhaps without even being aware of the interposition of the third individual 56), the service component 24 responds in an amnesiac manner by initiating a second interaction 48 with a greeting, potentially confusing and frustrating the first individual 22 and the second individual 40. These and other limitations arise from the inability of the interface 32 to identify and process concurrent interactions 26 with multiple individuals 22 comprising multiple parties, as may often arise in many real-world scenarios.

Figure 4:
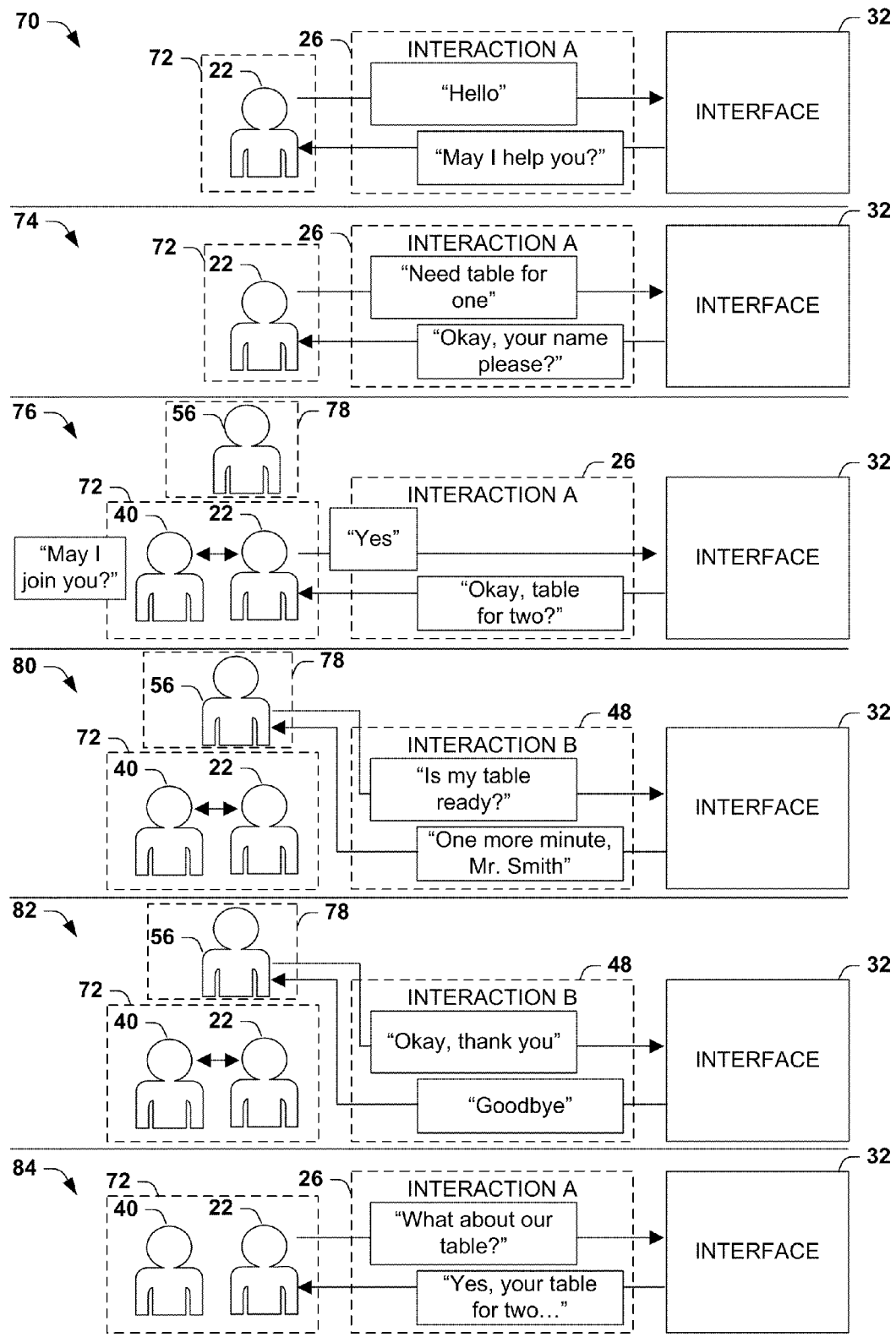
FIG. 4 is an illustration of an exemplary scenario featuring a servicing of individuals according to the exemplary knowledge system of FIG. 1 using a multi-party interface.

FIG. 4 presents a contrasting exemplary scenario, wherein an interface 32 to a service component 24 is equipped and configured to identify multiple individuals 22 in a particular scene (e.g., a lobby of a restaurant), to associate the individuals 22 with parties, and to handle interactions 26 with various parties in a more helpful manner. Again, at a first time point 70, a first individual 22 approaches the service component 24 and requests a table. However, in this exemplary scenario, the interface 32 identifies the individual 22 as belonging to a party 72 (presently comprising only the first individual 22), and initiates the first interaction 26 with the party 72. At the second time point 74, the first individual 22 requests a table, and in accordance with the input presented by the interface 32, the service component 24 initiates the request. However, at the third time point 76, when the second individual 40 joins the first individual 22, the interface 32 may recognize that the second individual 40 is joining the party 72. This recognition may occur, e.g., by interpreting the proximity of the second individual 40 to the first individual 22; the orientation of these individuals with respect to one another, the approach trajectory of individual 40, the mutual familiarity apparent in the conversation between the first individual 22 and the second individual 40; and/or the conversational semantics of the second individual 40 asking to join the first individual 22. Moreover, the interface 32 may deduce (either from the addition of the second individual 40 to the party 72 or from the semantics of the side conversation) the implicit expansion of the table request to accommodate two individuals. Finally, the interface 32 may identify the ongoing side conversation between the first individual 22 and the second individual 40, and may recognize that the first interaction 26 has not been abandoned, but is not being actively attended by the first party 72. If the interface 32 or the service component 24 is not fully confident of the inclusion of the second individual 40 with the first party 72, or with the implied expansion of the request to accommodate both individuals, the interface 32 may ask a follow-up question to clarify (e.g., "would you like a table for two instead?")

As further illustrated in FIG. 4, when the third individual 56 approaches the service component 24, the third individual 56 may stand apart from and not oriented to the first individual 22 and the second individual 40, and there may be no acknowledgement of familiarity or conversation. The interface 32 may identify the third individual 56, but may associate the third individual 56 with second party 78, as no relationship is detected with the individuals of the first party 72. When the third individual 56 speaks to the interface 32, the interface 32 may initiate a second interaction 48 with the second party 78. The interface 32 may also choose to permit this interposed second interaction 48 because of the implied suspension of the first interaction 26 with the first party 72. (By contrast, if the third individual 56 had interrupted the first interaction 26, the interface 32 may have politely asked the third individual 56 to hold the inquiry until the first interaction 26 was complete.) Moreover, the interface 32 may identify the third individual 56 from a recently completed interaction with the third individual 56; may interpret the inquiry of the third individual 56 in the context of the recent interaction; and may respond in a more natural and helpful manner. Finally, when the first individual 78 resumes the interaction 26 with the with the service component 24, the interface 32 may identify the first individual 22 and the first party 72, and may resume the interaction 26 in a natural manner. The smoother and more helpful handling of these interactions 26 by the interface 32, in contrast with the discontinuous and confusing interactions 26 illustrated in FIG. 3, are made possible by the configuration of the interface 32 to identify multi-party interactions 26, and to interact with various individuals 22 in the context of the identified parties 72 and the interactions 26 therewith.

Figure 5:
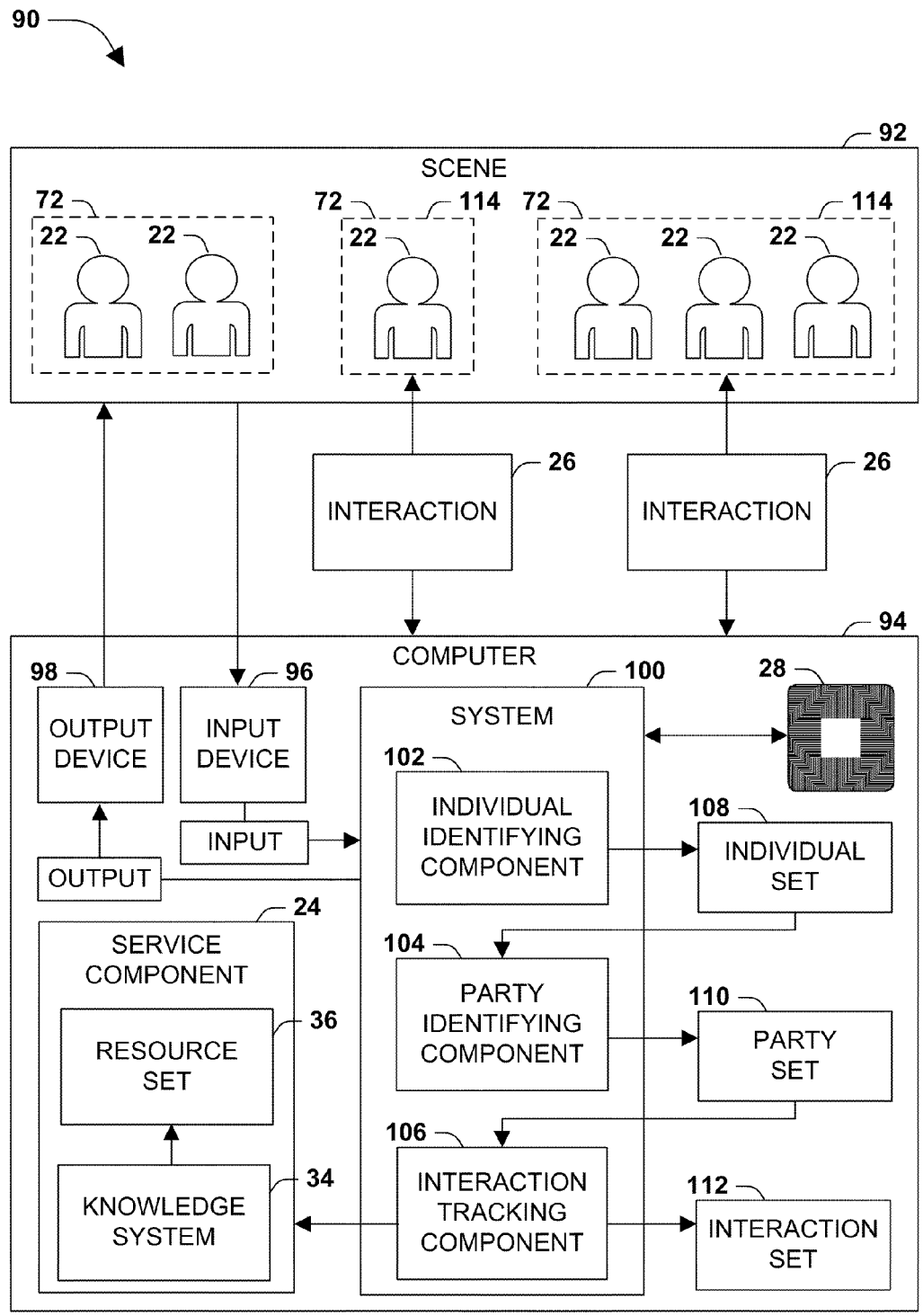
FIG. 5 is a component block diagram illustrating an exemplary system for managing interactions of a service component with at least two parties within a scene.

FIG. 5 illustrates a first embodiment of the techniques discussed herein, comprising an exemplary system 100 operating within an exemplary scenario 90 featuring a set of individuals 22 within a scene 92. The exemplary system 100 may be configured to facilitate a service component 24 in interacting with the individuals 22 in a more convenient and natural manner (such as illustrated in FIG. 4) than may be achieved by comparable single-individual systems (such as illustrated in FIG. 3.) The exemplary system 100 may operate within a computer 94, e.g., as a set of software instructions executed by a processor 28, and may utilize input received from one or more input devices 96 (e.g., cameras, microphones, keyboards, touchscreens and other pointing devices, biometric sensors such as fingerprint readers, and scanners such as barcode readers) and may deliver output to one or more output devices 98 (e.g., displays, speakers, printers, and control of other components, such as security turnstiles in a receptionist scenario.) The exemplary system may therefore serve as an interface 32 between the individuals 22 and a service component 24 that uses a knowledge system 34 to regulate access to a resource set 36, such as a set of services that the individuals 22 wish to use.

Accordingly, the exemplary system 100 of FIG. 5 may be configured to manage interactions of the service component 24 with at least two parties 72 within the scene 92. For example, the exemplary system 100 may comprise an individual identifying component 102, which may be configured to identify individuals 22 within the scene 92 (e.g., through a face recognition algorithm operating on video input received from the input component 96.) The individual identifying component 102 may therefore generate an individual set 108, comprising representations of the individuals 22 identified within the scene 92. The exemplary system may also comprise a party identify component 104, which may be configured to associate individuals 22 within the scene 92 (e.g., those represented in the individual set 108) with at least one party 72 (e.g., by evaluating the proximity of respective individuals 22, the spatio-temporal trajectory of individuals 22, the orientation of the individuals 22 with respect to others, communications and mutual attention among individuals 22 indicating affiliation or familiarity, and communications directed to the service component 24 indicating affiliation.) The party identifying component 104 thereby generates a party set 110 comprising representations of the respective parties 72 identified within the scene 92 and associations of the individuals 22 represented in the individual set 108. The exemplary system 100 also comprises an interaction tracking component 106, which may be configured to track interactions 26 with at least one interaction party 114 (i.e., with one or more parties 72 participating in a particular interaction 26.) For respective interactions 26, the interaction tracking component 106 may receive communications from individuals 22 of the interaction parties 114, and based on these communications, may direct the service component 24 in communicating to the interaction parties 114. As a first example, the interaction tracking component 106 may evaluate the input received from the individuals 22 of an interaction party 114 and may provide information to the service component 24 that may be used in the knowledge system 34, e.g., which interaction 26 is to be currently addressed by the service component 24, and the number of individuals 22 within each interaction party 114 in the active interaction 26. As a second example, the interaction tracking component 106 may receive output from the service component 24 (e.g., scripted responses generated by the knowledge system 34) and may relay this information to particular individuals 22 and interaction parties 114 through the output device 98. In this manner, the exemplary system 100 may facilitate the service component 24 in interacting with the individuals 22 in a multi-party manner, thereby enabling some or all of the advantages illustrated in FIG. 4. Moreover, these advantages may be achievable for many types of knowledge system 34 that may be useful within a wide range of scenarios.

Figure 6:
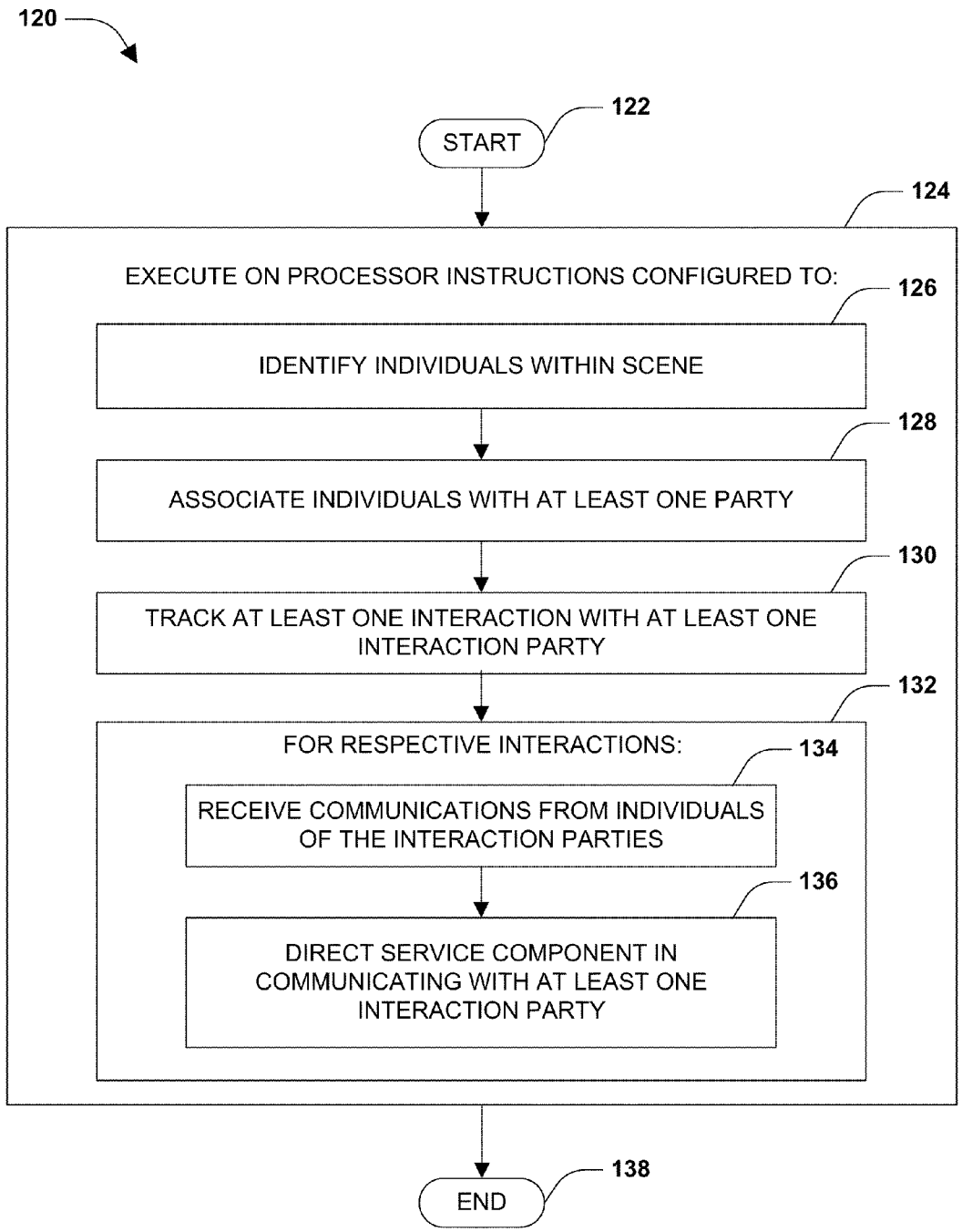
FIG. 6 is a flow chart illustrating an exemplary method of managing interactions of a service component with at least two parties within a scene.

FIG. 6 presents a second exemplary embodiment of the techniques discussed herein, illustrates as an exemplary method 120 configured to manage interactions 26 of a service component 24 with least two parties 72 within a scene 92. The exemplary method 120 may, e.g., be formulated as a set of software instructions executing on a processor 28 of a computer 94 having access to the service component 24 and a set of devices 30 (such as input devices 96 and output devices 98) that may communicate with the individuals 22 within the scene 92. The exemplary method 120 begins at 122 and involves identifying 124 the individuals 22 within the scene 92 (e.g., by applying a face identifying algorithm to video input from an input device 96.) The exemplary method 120 also involves associating 126 the individuals 22 with at least one party 72 (e.g., by evaluating the physical proximity of the individuals 22, the communications thereamong, and historic information, such as prior interactions 26 featuring a party 72 comprising the same set of individuals 22.) The exemplary method 120 also involves tracking 128 at least one interaction 26 with at least one interaction party 114. For respective interactions 132, the exemplary method 120 may involve receiving 134 communications from individuals 22 of the interaction parties 114 to the interaction 26, and directing 136 the service component 24 in communicating to the interaction parties 114 and the individuals 22 associated therewith. By facilitating the service component 24 in interacting with the individuals 22 represented as parties 72, the exemplary method 120 thereby serves as a multi-party interface 32 that enables more natural and efficient interactions than single-user interfaces, and so ends at 138.

Figure 7:
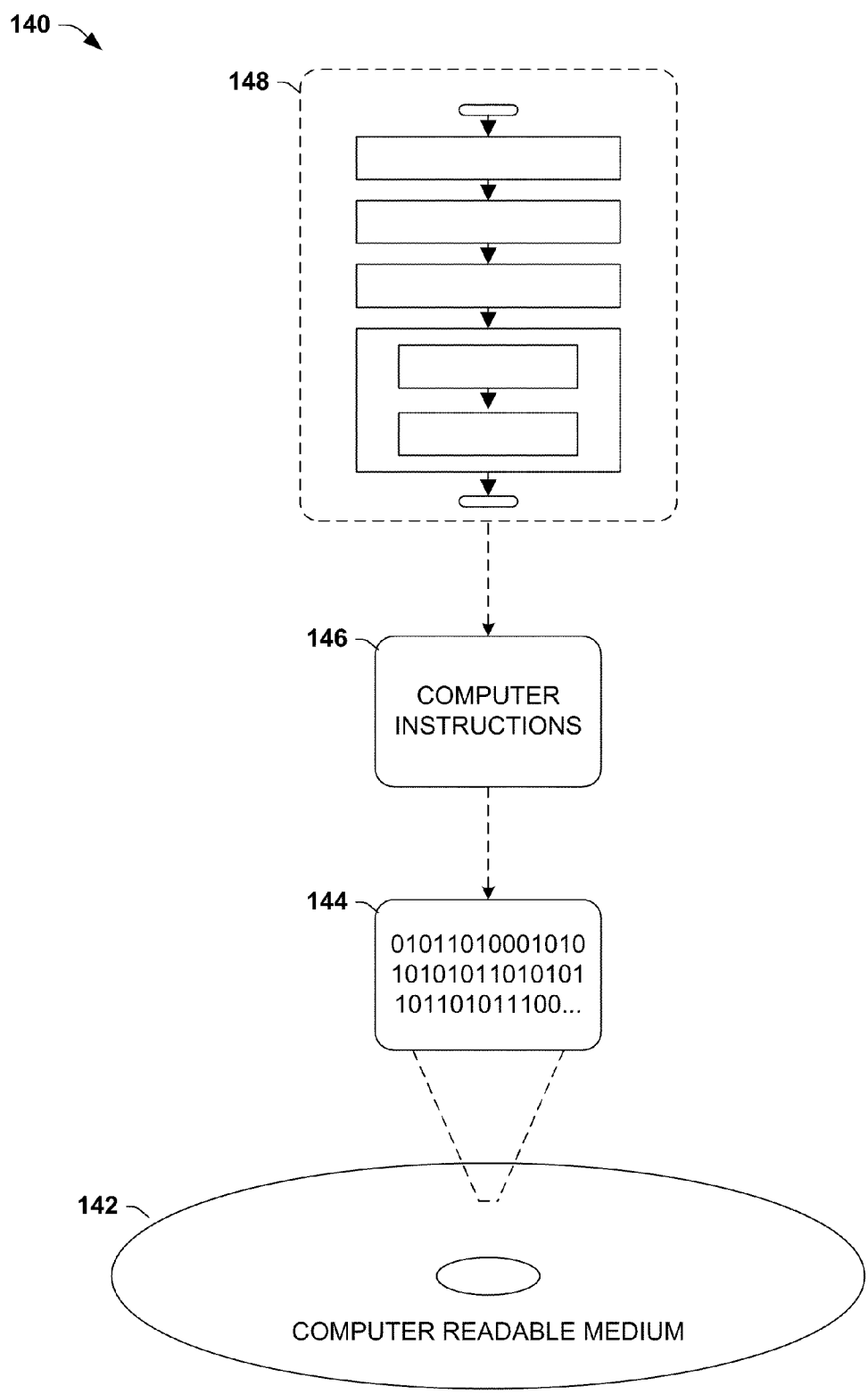
FIG. 7 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 7, wherein the implementation 140 comprises a computer-readable medium 142 (e.g., a CD-R, DVD-R, or a platter of a hard disk drive), on which is encoded computer-readable data 144. This computer-readable data 144 in turn comprises a set of computer instructions 146 configured to operate according to the principles set forth herein. In one such embodiment, the processor-executable instructions 146 may be configured to perform a method of managing interactions of a service component with at least two parties within a scene, such as the exemplary method 120 of FIG. 6. In another such embodiment, the processor-executable instructions 146 may be configured to implement a system for managing interactions of a service component with at least two parties within a scene, such as the exemplary system 100 of FIG. 5. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 120 of FIG. 6 and the exemplary system 100 of FIG. 5) to confer individual and/or synergistic advantages upon such embodiments.

A first aspect that may vary among embodiments of these techniques relates to the scenarios in which embodiments of these techniques may be utilized. As a first variation, these techniques may be used as an interface to many types of service components 24, which may be configured in many ways to manage access to a resource set 36 (such as a set of services that may be requested and performed on behalf of the individuals 22 according to a business logic.) As a first example, the service component 24 may comprise a knowledge system, such as the exemplary knowledge system 10 of FIG. 1, which may be configured to receive requests presented in a normalized manner, to perform various actions on the resource set 36, and to provide scripted output. As a second example, the service component 24 may utilize a learning function, such as a fuzzy logic classifier or a neural network, to infer the actions to be performed on the resource set 36 on behalf of the individuals 24 and parties 72. Additionally, such service components may operate in a variety of real-world service-oriented scenarios, such as an automated maître d' of a restaurant; an automated taxi service that facilitates the taxi transaction; or an automated receptionist or security guard of a building. In some of these scenarios, the service component may handle an interaction 26 involving multiple parties 72, e.g., an automated auction mediator that handles a concurrent set of auctions, where each auction involves a selling party 72 and one or more bidding parties 72.

Figure 8:
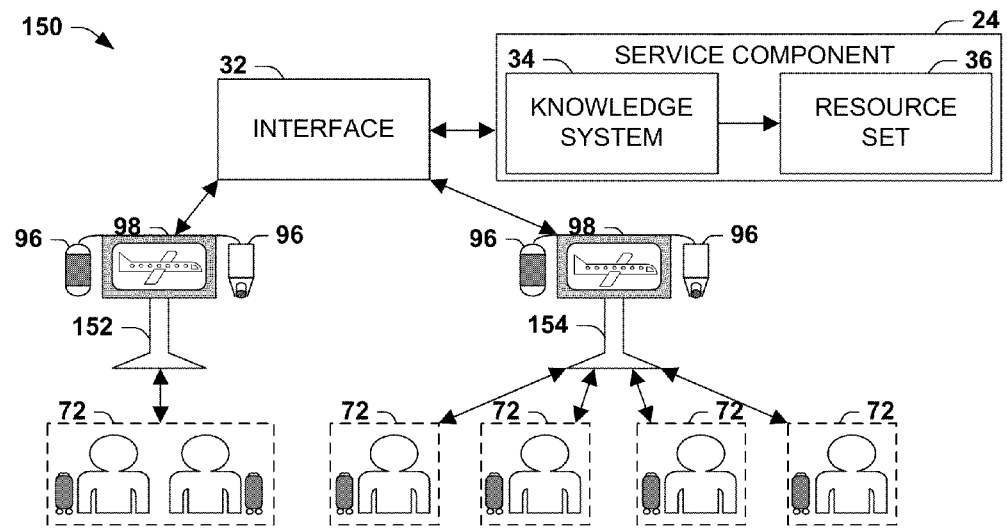
FIG. 8 is an illustration of an exemplary scenario featuring an exemplary system configured to handle multi-party interactions.

FIG. 8 presents a comparatively complex exemplary scenario 150, comprising an airport check-in scenario wherein the techniques discussed herein may be applied. In many such scenarios, a set of kiosks may be provided that permit an individual 22 to purchase tickets, check in for flights, check luggage, etc. However, such kiosks are often limited to interactions with a single user, even if the user is a member of a party 72 involving several individuals 22 (e.g., a set of business associates traveling together.) Therefore, such kiosks may compel the individuals 22 to perform various transactions separately, such as by individually checking in for the same flight or checking luggage. These kiosks may interact with one individual 22 acting on behalf of a group (such as a family that has purchased tickets together), but the interaction 26 is often limited to the single individual 22 interacting with the service component 24 on behalf of the group. Alternatively, the kiosk may simulate an interaction with multiple individuals 22 in the group (e.g., by presenting a set of security questions to be answered by each individual 22 in turn), but may not be capable of determining which individual 22 is actually interacting with the kiosk; therefore, one individual 22 may deceptively answer each set of security questions on behalf of the other individuals 22.

Instead, and as illustrated in FIG. 8, the exemplary techniques may be utilized to permit multiple individuals 22 in various parties 72 to perform an interaction 26 together. For example, an interface 32 to a service component 24 that manages access to a resource set 36 (e.g., a flight check-in database) through a knowledge system 34 (e.g., the business logic of handling passenger check-in) may be connected to a set of kiosks, each featuring input devices 96 (e.g., a camera and a microphone) and an output device 98 (e.g., a display.) The configuration of the kiosks through a multi-party interface 32 may permit each kiosk to provide a wider array of services and to achieve a higher efficiency of use. A first kiosk 152 may check in a party 72 by allowing the individuals 22 of the first party to interact with the kiosk together (e.g., "both passengers, please answer the following security questions together . . . ") By contrast, the same process may have involved separately checking in each individual 22, either in series on a single kiosk or by concurrently occupying two kiosks. A second kiosk 154 may handle an interaction 26 involving multiple parties, such as a negotiation and allocation of available seats among a set of standby travelers for a flight. Such multi-party transactions may be difficult to perform on a kiosk with a single-individual interface, and may have involved a representative of the airline, but may be readily achievable through a multi-party interface 32 such as described herein.

Figure 9:
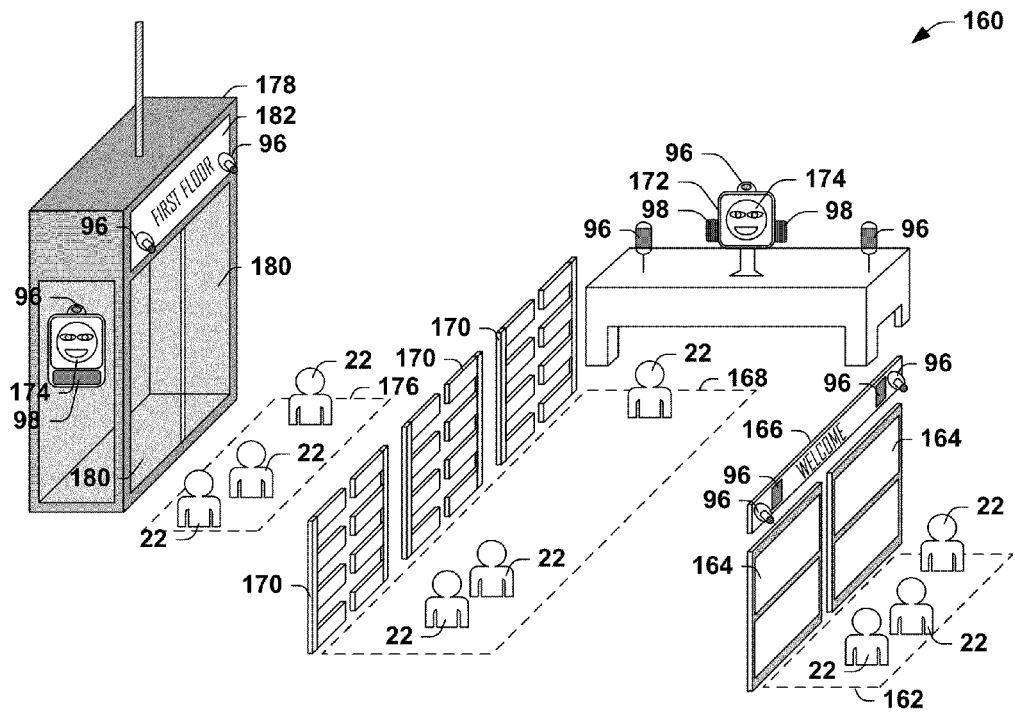
FIG. 9 is an illustration of an exemplary scenario featuring several exemplary systems configured to handle multi-party interactions.

FIG. 9 presents another exemplary scenario 160 featuring several exemplary systems within the general setting of regulating access to a building. Individuals 22 comprising one or more parties 72 may visit the building, and may interact with exemplary systems servicing various scenes 92 and controlling various physical resources. Upon arrival, the individuals 22 may encounter a first scene 162 at the entrance of the building, wherein a physical resources comprising a door 164 may be controlled to admit individuals 22. This door 164 may be automated, e.g., to open automatically upon detecting individuals 22 who wish to enter the building. While many such systems are commonly in use, such systems tend to operate on comparatively primitive principles that may lead to inefficiencies. For example, a door sensor may be activated by an interruption of an optical beam across the threshold of the door, but this trigger may be inadvertently tripped by individuals 22 who pass or stand near the door but do not wish to pass through, or an obstacle might inadvertently break the optical beam to leave the door undesirably ajar. By contrast, the door 164 in the exemplary scenario 160 of FIG. 9 is controlled by an exemplary system 166 equipped with various input devices 96, such as cameras and microphones. An automation component may be configured to control the door, such as a motor operable to open the door 164 and to permit the door 164 to close (either by reversing the motor or by letting another force, such as gravity or a spring, bring the door 164 to a closed position.) The service component 24 may be configured to, upon detecting at least one interaction party 114 intending to pass through the door 164, open the door 164 by activating the automation component, and between detected interaction parties 114 intending to pass through the door 164, to close the door 164. For example, if the exemplary system 166 determines an individual 22 is approaching the door 164 with inferred intent to enter, the exemplary system 166 may open the door 164; but if the exemplary system 166 detects inanimate objects or animals within the first scene 162, or detects individuals 22 who are standing within the first scene 162 but who are stationary and/or waiting (e.g., awaiting a shuttle, reading a newspaper, or taking shelter from inclement weather) or who are engaged in an extended discussion with other individuals 22, the exemplary system 166 may keep the door 164 closed, thereby reducing wear on the mechanisms of the door 164 and preserving the climate of the building. More sophisticated embodiments may even identify individuals 22 by face recognition and respond by greeting the individuals 22, alerting related individuals 22 inside the building, or providing audible directions to the location of an imminent meeting that the individual 22 is due to attend. In this manner, the exemplary system 166 may exhibit the basic social awareness of a human doorkeeper, which may be more pleasant, helpful, and efficient than a beam-actuated automated door.

Upon passing through the door 164, the individuals 22 may enter a second scene 168 comprising the lobby of the building. Whereas the door 164 provides building access to all visitors who wish to enter, the second scene 168 may enable restricted access to the building through one or more gates 170, which may be unlocked for authorized visitors but may remain locked to obstruct entry by unauthorized individuals. In many contemporary scenarios, such gates may be operated by comparatively primitive security mechanisms, such as badge readers that may read security badges presented by individuals 22 or keypads configured to accept a security code. Alternatively, a human receptionist may be present to interact with individuals 22 and to operate of the gates. By contrast, in the exemplary scenario 160 of FIG. 9, an exemplary system 172 may monitor the second scene 168 and may control the gates 170 through an automation component, e.g., a set of motors configured to open and close the gates 170, or a mechanized lock that permits or restricts an attempt by an individual 22 to push through the gate 170. The exemplary system 172 may be equipped with various input devices 96 (e.g., a camera mounted atop a display and a pair of microphones that may triangulate the location of speaking individuals 22) and/or output devices (e.g., a set of speakers 98 and a display, whereupon may be rendered an avatar 174 presented as an interface to the service component 24, i.e., the business logic involved in servicing individuals 22 present in the lobby.) The exemplary system 172 may verify the security clearance of individuals 22 and may admit authorized individuals 22 by opening or unlocking the gates 170. Moreover, the exemplary system 172 may provide more sophisticated services, such as allowing an employee to register a visitor; allowing visitors to contact employees to request access to the building; arranging meetings within the building among employees and visitors; providing directions to individuals 22 within the building and corporate campus; and requesting shuttles for individuals 22 who wish to leave the building. These services may often involve the authentication of individuals 22, e.g., through face, voice, or other biometric recognition or by a card reader; the association of individuals 22 with parties 72; the identification of relationships between individuals 22; and the determination and prioritization of intents of the individuals 22, as well as the communication with the individuals 22 in a natural and sociable manner. The exemplary system 172 may therefore exhibit the social awareness of a receptionist, which may be more pleasant, helpful, and efficient than a basic security mechanism.

Authorized individuals 22 who pass through the gates 170 may then enter a third scene 176, involving an elevator 178 configured to transport individuals 22 vertically among the floors of the building. Many contemporary elevators are controlled by comparatively primitive interfaces, such as pushbutton interfaces that enable individuals to perform basic elevator operations, including selecting floors and opening or closing the doors of the elevator. However, the exemplary scenario 160 of FIG. 9 features an exemplary system 182 configured to operate an automation component (e.g., a winch controlling the raising and lowering of the elevator 178 and the motor operating the doors 180 of the elevator 178) on behalf of individuals 22 operating in a multi-party setting. The exemplary system 182 may be equipped with various input devices 96 (e.g., cameras and microphones positioned at each floor and within the elevator 178) and output devices 98 (e.g., a speaker and a display rendering an avatar 174 within the elevator 178.) Utilizing these capabilities, the exemplary system 182 may detect individuals 22 within the third scene 176 (including the exterior proximity of the elevator portal on various floors, as well as the interior of the elevator 178) and may allow such individuals 22 to request transportation to various floors, e.g., through push-button interfaces or speech recognition. The exemplary system 182 may also provide more sophisticated functionality. As a first example, the exemplary system 182 may predict the intent of an individual 22 to board the elevator 178 (perhaps while the individual 22 is far down the hallway), and may automatically send the elevator 178 to the floor of the individual 22. As a second example, the exemplary system 182 may identify parties 72 and may query the parties 72 for destinations instead of individually querying several individuals 22 of the same party 72. As a third example, the exemplary system 182 may utilize face recognition to identify an individual 22, consult a meeting schedule to predict a destination of the individual 22, and convey the individual 22 to the correct floor without prompting, and may even direct the individual 22 to the location of the meeting. As a fourth example, the exemplary system 182 may allocate a set of elevators more efficiently, e.g., by allocating one elevator 178 to pick up individuals 22 on several floors who are headed to the same floor, or by detecting an elevator 178 filled to capacity and passing any floors with boarding individuals. The exemplary system 182 may therefore exhibit the social awareness of a human elevator operator, and may more easily communicate with individuals 22 while more efficiently and desirably allocating the resources of one or more elevators 182. In this manner, the exemplary systems presented in FIG. 9 operate, individually or in cooperation, to provide a more capable, efficient, and user-friendly interface between individuals 22 and parties 72 and the service components 24 and automation components regulating the provision of various physical resources. Those of ordinary skill in the art may devise many such scenarios in which the techniques described herein may be utilized.

A second variation of this first aspect involves the types of devices 30 that may be utilized in multi-party interfaces 32 such as described herein. As a first example, a diverse set of input devices 96 may be configured to detect various individuals 22 using and communicating with the interface 32, e.g., to generate input pertaining to the at least one individual 22, and to deliver the input to the individual identifying component 102. A microphone may capture voice input from an individual 22, and a keyboard, touchscreen, or other tactile device may capture data entry form the individual 22. A still or video camera may capture an image of an individual 22, and an infrared camera, light sensor, or other device may detect the presence of individuals 22 and distinguish among individuals 22 within the scene 92. Biometric devices may detect many physiological properties of an individual 22, such as a face detector that may measure a face and match the metrics against a face-matching database of known individuals 22, or a fingerprint reader that may identify an individual 22 according to a fingerprint. Other types of scanners may detect other identifiers of an individual 22 (e.g., a radiofrequency identification [RFID], barcode, or magnetic scanner configured to read an identification card or credit card of the individual 22.) Moreover, these input devices 96 may cooperate in detecting, identifying, and locating an individual 22; e.g., an array of microphones may, in addition to accepting voice input from an individual 22, triangulate the position of the individual 22 within the scene 92, while a videocamera may identify the individual 22 using a face-matching database.

As a second example of this second variation, a diverse set of output devices 98 may be operated by the interface 32 (or directly utilized by the service component 24) to render the output of the service component 24, e.g., to receive output from the interaction tracking component 106 to be delivered to at least one individual 22 associated with at least one party 72, and to render the output to the at least one individual 22. For example, a speaker may present a synthesized voice, while a display may present text or pictorial output to an individual 22. These components may also operate synergistically, e.g., to produce a visual representation of an avatar of the service component 24 that speaks to individuals 22 using a simulated voice. Additional components may be manipulated in the interaction 26, such as a printer (e.g., configured to print boarding passes for air travelers), a vehicle operated in whole or in part by an automated driver, and a security turnstile operated by an automated receptionist or security guard.

As a third example of this second variation, the system may comprise various resources to be regulated by the service component 24. In a first such scenario, the system may be devised to regulate one or more virtual resources, such as a database storing various types of data (e.g., the reservation book for the restaurant in the exemplary scenario 90 of FIG. 5) or a computing resource that may perform various tasks on behalf of such individuals 22 (e.g., a ticket booking system in an air travel scenario that may perform various ticket issuing and validating services on behalf of individuals 22). In a second such scenario, the resource may comprise a physical resource that may be controlled by an embodiment of these techniques, such as a door, a gate, an elevator, a printer, a dispenser, a robot, or a train or other type of vehicle. The system may therefore comprise an automation component that is configured to control the physical resource according to the service component. As a first example, the service component may specify the logical operations to be performed by an elevator to convey multi-individual parties to different floors of a building, and an automation component may accept output from the service component and may control the operation of the elevator to perform the output (e.g., opening and closing the elevator doors and moving among the floors of the building.) As a second example, the service component may represent the logic of a receptionist of a building to which access is regulated by a security mechanism, such as a gate. The system may therefore include a gate actuator that may unlock the gate to permit authorized visitors to enter the building (as determined by the service component) and may lock the gate to obstruct entry by unauthorized individuals. Many such resources may be included in many such scenarios utilizing the techniques discussed herein.

Figure 10:
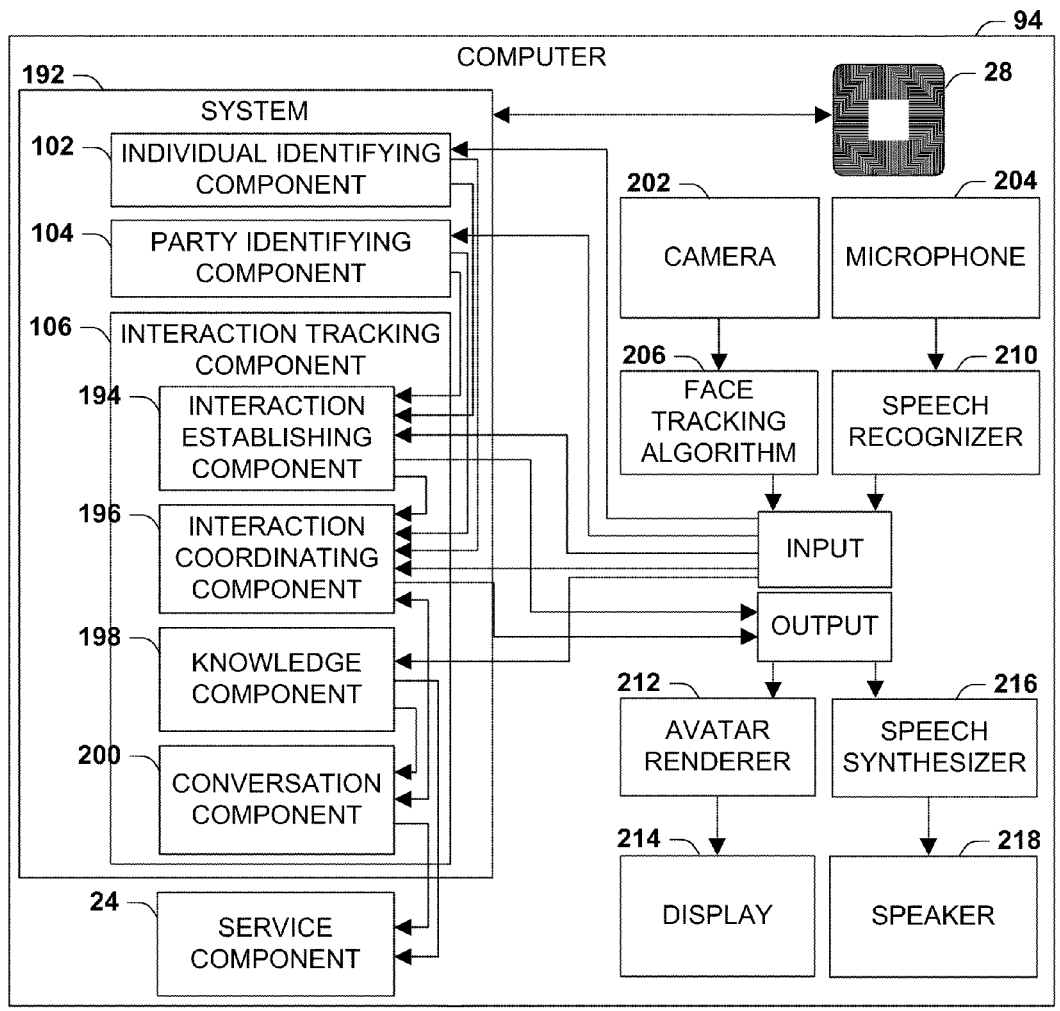
FIG. 10 is a component block diagram illustrating an exemplary architecture of an exemplary system configured to manage interactions of a service component with at least two parties within a scene.

A third variation of this first aspect involves the architecture of embodiments of these techniques. While the exemplary scenario 90 of FIG. 5 illustrates one exemplary system 100, many such architectures may be utilized in other embodiments, e.g., to customize the interface 32 for a particular scenario or to confer additional advantages upon the embodiment. FIG. 10 presents an exemplary scenario 190 featuring a more detailed architecture of these techniques, comprising a set of components of a computer 94 wherein the interactions of a service component 24 are managed by an exemplary system 192 configured as described herein. The computer 94 might also comprise, e.g., a set of input devices, such as one or more cameras 202 and one or more microphones 206; a set of output devices, such as a display 214 and a speaker 218; and a processor 28 that may execute the portions of the exemplary system 192 that are configured as processor-executable instructions. The camera(s) 202 may deliver output to a face tracking algorithm 204, which may identify faces of individual 22 within a scene 92. The microphone(s) 206 may deliver output to a speech recognizer 210, which may identify voices and detect spoken words from the individuals 22 within the scene. Additional input processing may also be performed; e.g., the video input from the camera(s) 202 may be evaluated to identify visual characteristics of respective individuals 22, such as the position of a visually identified individual 22 within the scene 92, and the audio input from an array of microphones 206 may be triangulated to identify a position of a speaking individual 22 within the scene 92. Together, these input variables may be delivered to the exemplary system 192. Similarly, the output of the exemplary system 192 may be delivered to the display 214 and to the speaker 218 by way of some output rendering components. For example, an avatar renderer 212 may render a visual representation of an avatar of the service component 24 to be displayed on the display 214, and textual output may be processed by a speech synthesizer 216 to synthesize a voice of the avatar to be delivered through the speaker 218.

Within this computer 94, the exemplary system 192 may be provided to mediate the input and output data and the service component 24. For example, the input may be delivered to the individual identifying component 102, which may be configured to identify individuals 22 within the scene 92, and to the party identifying component 104, which may be configured to associate individuals 22 within the scene 92 with at least one party 72. However, as illustrated in FIG. 10, the architecture of the interaction tracking component 106 may be divided into more specific units.

As a first example, the interaction tracking component 106 may comprise an interaction establishing component 194, which may be configured to track interactions 26 that may be established between the service component 24 and at least one interaction party 114 of an interaction 26. For example, the interaction tracking component 106 may be configured to identify when an individual 22 or party 72 indicates an intent to establish an interaction 26 with the service component 24, or to join an existing interaction 26; which interaction 26 the service component 24 is currently active, and whether an interaction 26 is inactive (e.g., if an individual 22 is distracted by a side-conversation); and when interaction 26 are terminated by the interaction parties 114 or the service component 24. The interaction establishing component 194 may therefore serve as an interface to other components of the interaction tracking component 106 (e.g., "who wishes to speak to the service component 24 first?") As one example, output to be delivered to multiple interaction parties 114 may be enqueued, and the interaction establishing component 194 may triage the delivery of information to the interaction parties 114 based on the priority of the information, the costs of waiting for the various interaction parties, social constraints, and social etiquette rules.

As a second example, the interaction tracking component 106 of FIG. 10 may comprise an interaction coordinating component 196, which may be configured to, for respective interactions 26, coordinate communications of the service component 24 with individuals 22 of the interaction parties 114. For example, the interaction coordinating component 196 may coordinate a conversation by detecting whether an individual 22 in an interaction party 114 is speaking, which individual 22 is speaking, whether the individual 22 is speaking to the service component 24 or to someone else, when each individual 22 has the conversational floor (i.e., the right to speak according to conversational norms), and when the service component 24 has the conversational floor, i.e., an opportunity arises to respond with output from the service component 24. The interaction coordinating component 196 might also direct output from the service component 24 to a particular individual 22 within an interaction party 114, or may direct output concerning all individuals 22 of interaction party 114 to a party leader of the interaction party 114. Additionally, the interaction coordinating component 196 may detect and handle interruptions by individuals 22. Depending on context, the interaction coordinating component 196 might allow an individual 22 to interrupt the service component 24, or might attempt to preclude or overcome an interruption. In exceptional cases, the interaction coordinating component 196 may identify when a speaking individual 22 may be interrupted by the service component 24. The interaction coordinating component 196 may therefore establish and respect a natural conversational pacing of the service component 24 while communicating with interaction parties 114 within an interaction 26 (e.g., "when may the service component 24 speak?")

As a third example, the interaction tracking component 106 of FIG. 10 may comprise a knowledge component 198, which may be configured to identify information items about the individuals 22 within the scene 92. As a first example, the knowledge component 198 may endeavor to classify particular individuals 22 based on video input, such as by the type of clothing worn, and/or audio input, such as a stress level detected in the voice of an individual 22. As a second example, the knowledge component 198 may record a profile of individuals 22 with whom the knowledge component 198 has previously interacted. When an individual 22 approaches the service component 24 for a second time, the knowledge component 198 may match the face and/or other biometrics (including for instance voice, height, or even clothing) of the individual 22 to the stored profile of the individual 22, and may retrieve the known information about the individual 22, such as by continuing a previously interrupted interaction 26 or by predicting the current intent of the individual 22. The knowledge component 198 may deliver the information items detected about an individual 22 to the service component 24, which may use such information items in providing the services to the individual 22. As another example, the knowledge component 198 may also exhibit proactive awareness of the scene 92, such as by monitoring individuals 22 and parties 72 that are not yet involved in an interaction 26 for information that might later be used to initiate an interaction 26. For example, an individual 22 may be identified as waiting in a restaurant lobby, until a second individual 40 arrives and speaks with the individual 22. If the individual 22 then approaches the service component 24, the knowledge component 198 may identify the individual 22 and the second individual 40 as a party 72 that is likely to request a table for two.

As a fourth example, the interaction tracking component 106 of FIG. 10 may comprise a conversation component 200, which may be configured, for respective interactions 26, to deliver output from the service component 24 into the interaction 26 with the at least one interaction party 114. For example, the conversation component 200 may determine and formulate questions to be asked of the individuals 22 and the interaction parties 114 in order to solicit information to be used by the service component 24, and how to deliver the output of the service component 24 to various interaction parties 114 and individuals 22. The conversation component 200 may therefore determine, based on the input from the individuals 22 and interaction parties 114 and from the output of the service component 24, what, when, how, and to whom information is to be communicated by the service component 24. Moreover, the conversation component 200 may deliver selected conversational output to the interaction coordinating component 196, which may identify an opportunity to speak (through the speaker 218 via the speech synthesizer 216) to the target of the communication, which may in turn rely on the interaction establishing component 194 to determine when the interaction 26 of interest is active. In this manner, the architecture of the interaction tracking component 106 may interoperate to achieve the directing of the service component 24 in communicating with the individuals 22 in a multi-party, multi-individual scenario. However, other architectures may be devised by those of ordinary skill in the art while implementing the techniques discussed herein.

A second aspect that may vary among embodiments of these techniques relates to the information that may be gathered about individuals 22 in order to identify such individuals 22, to identify the associations of individuals 22 with parties 72, and to interact with such individuals 22 in a multi-user, multi-party manner. In social situations, humans may identify many types of behaviors that suggest roles, relationships, and intentions of individuals 22 and parties 72 within a scene 92. As a first example, the relative spatio-temporal trajectory, proximity and facing of a first individual with respect to a second individual may be indicative of an interaction therebetween or a party association. For example, two individuals 22 may be identified as a party 72 if they are positioned near and facing each other, if they are walking together in proximity and at approximately the same pace, if the first individual 22 catches up with the second individual 22 and matches pace; or may be identified as different parties if they are standing near but facing away from each other, or if they are in proximity only because the scene is small or crowded. As a third example, natural language evaluation applied to speaking individuals 22 within a scene 92 may be capable of differentiating individuals 22 who are discussing a matter as a party 72 from individuals 22 who are engaged in trivial conversation, or who are not speaking to each other (e.g., who are instead talking on cellphones.) As a third example, physical gestures by and among individuals may indicate relationships (e.g., handshakes or a nod of the head) and/or intentions (e.g., in the exemplary scenario 170 of FIG. 9, an individual 22 may signal the elevator 178 by pointing at the elevator, nodding, or walking briskly toward the elevator, or may dismiss an offer for the elevator 178 by waving away the elevator 178, shaking the head, or walking slowly or tangentially in the vicinity of the elevator 178.) As a fourth example, the gaze of an individual 22 may be detected, e.g., by a face identification algorithm that may extrapolate the orientation of the individual's head and eyes, and may project the orientation of the eyes of the individual 22 to identify the focal point of the gaze of the individual 22. Those of ordinary skill in the art may identify many such behaviors, and to utilize such behaviors in many of the evaluative processes involved in the techniques discussed herein.

A third aspect that may vary among embodiments of these techniques relates to the identification of individuals 22 and parties 72 within the scene 92, such as may be performed by the party identifying component 104 in the exemplary system 94 of FIG. 10. Many factors may be included in the identification of individuals 22 and the association of such individuals 22 with parties 72. An embodiment of these techniques may be configured to identify individuals 22 within the scene 92, such as with a face tracking algorithm 204. Moreover, the embodiment may be configured to identify particular features of an individual 22, such as the position or movement of the individual within the scene 92 and the orientation of the individual 22 (e.g., where the user is looking or facing.) Based on this information, the interface 32 may then associate each individual 22 with one or more parties 72. For example, if positions of individuals 22 are identified, a party identifying component 104 may associate an individual with one or more parties according to the position of the individuals 22 within the scene 92, relative to the positions of other individuals 22 who are associated with a party 72. Embodiments may also take into account various behaviors, such as the relative spatio-temporal trajectory, proximity and orientation of respective individuals 22, a natural language analysis of the dialogue among individuals, and nonverbal gestures that indicate mutual familiarity and confederacy. Moreover, parties may change over time as individuals 22 join or leave a party 72, as parties 72 merge, or as a party 72 splits into two or more parties 72 that seem to have different agendas. Embodiments of these techniques may therefore monitor the ongoing social relationships of the individuals 22 to update the identification of parties 72 associated therewith.

Figure 11:
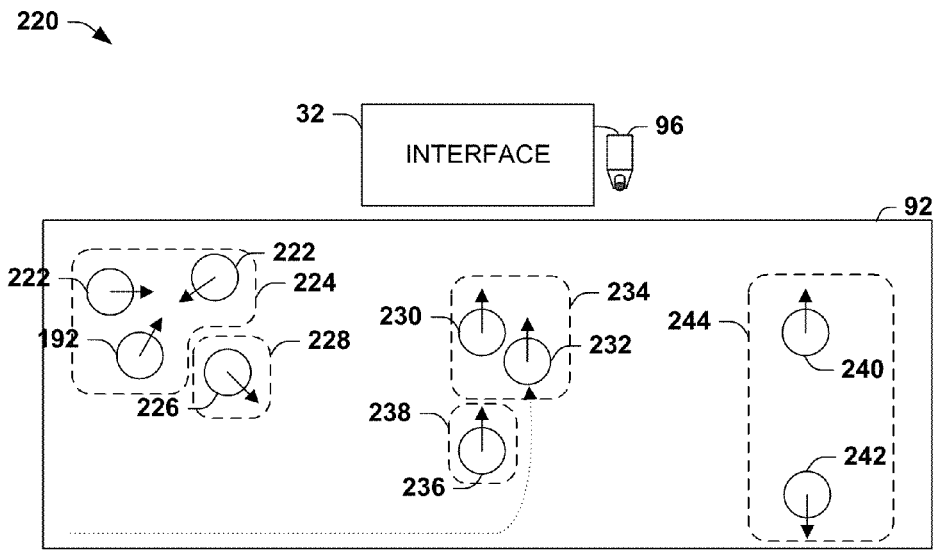
FIG. 11 is an illustration of an exemplary scenario featuring an identification of individuals with parties.

FIG. 11 illustrates an exemplary scenario 220 involving an interface 32 coupled with a camera operating as an input component 96. The interface 32 may process the input of the camera to identify nine individuals 22 within the scene 92, as well as behavioral and contextual cues, such as the positions and facing of each individual 22 with respect to other individuals 22. The interface 32 may then associate the individuals 22 with parties 72 based on this information. As a first example, three individuals 222 identified and positioned at the left side of the scene may be identified as a first party 224 if the three individuals 222 may be facing each other, while a fourth individual 226, who is standing nearby but is neither facing nor interacting with the three individuals 222 of the first party 224, may be identified as a second party 228. As a second example, a fifth individual 230 associated with a third party 234 may be standing in front of and interacting with the interface 32. Meanwhile, a seventh individual 232 may approach from outside the scene 92 and may stand near the fifth individual 230 in a manner that suggests familiarity and affiliation; accordingly, the interface 32 may associate the seventh individual 232 with the fourth party 234. However, a sixth individual 236, who is identified as standing near but behind the fifth individual 230, may be determined to be waiting in line for a subsequent interaction with the interface 32, and may therefore be associated with a fourth party 238. As a third example, an eight individual 240 and a ninth individual 242 may not be standing near each other or currently interacting. Ordinarily, these identified behaviors might indicate a lack of unity, suggesting that the individuals 22 are not of the same party 72. However, in this scenario, the interface 32 may determine that these two individuals 22 comprise a fifth party 244 based on contextual information, e.g., if the individuals arrived together, visually appear to be similarly dressed, and have previously engaged in a conversation. Moreover, in some embodiments, conversational analysis may be utilized to monitor the conversation, and to distinguish between party-suggestive dialogue (e.g., a discussion of a meeting that the individuals have arrived to attend) from other dialogue (e.g., small talk between strangers.) The interface 32 may therefore utilize the contextual clues identified with respect to the individuals 22 to deduce affiliations and to associate such individuals 22 with parties 72. However, if such deductions are uncertain, the interface 32 may clarify during an interaction with a party 72 (e.g., "are you two together?") Those of ordinary skill in the art may devise many techniques for identifying individuals 22 in a scene 92 and associating such individuals 22 with parties 72 while implementing the techniques discussed herein.

A fourth aspect that may vary among embodiments of these techniques relates to the tracking of interactions 26 by the parties 72 with the service component 24, such as by tracking the engagement of various individuals 22 with the service component 24. This tracking may be performed (e.g., by an interaction establishing component 194) to orient higher-order components of the embodiment (such as the interaction coordinating component 196, the knowledge component 198, and the conversation component 200 of FIG. 10) to the individuals 22 of a particular interaction party 114 of an interaction 26. A simple embodiment of this tracking may involve waiting for one of the identified parties 72 to indicate an intent to interact with the service component 24, engaging that party 72 in an interaction 26 through completion, and then awaiting an intent to interact from another party 72. Even this simple embodiment may present advantages, e.g., by identifying the individuals 22 within the scene 92 who comprise the interaction party 114; however, more sophisticated embodiments may incorporate additional features for tracking an interaction. As one such example, the embodiment may track multiple interactions 26 (such as multiple sets of interaction parties 114 standing in a queue), may serially select one interaction 26 at a time as an active interaction, may process the active interaction through completion, and may then select the next interaction 26 as the active interaction. More sophisticated embodiments may evaluate the behaviors of the individual 22, e.g., indications that the individual 22 is anxious to speak or is frustrated with the logic or output of the service component.

In some variations of this fourth aspect, the embodiment may designate an engagement status of various parties 72 with the service component 24, such as an "engaged" status (currently interacting with the service component 24), an "unengaged" status (not currently interacting with the service component 24), and a "waiting to engage" status (intending to interact with the service component 24. These designations may be made, e.g., according to the positions and orientations of respective individuals 22 as illustrated in FIG. 11, and may facilitate the selection of interactions 26 to be processed by the service component 24. As a first example, if at least two parties are identified in a "waiting to engage" status while no party is in an "engaged" status, an interaction 26 may be initiated or resumed with at least one of these waiting parties 72. As a second example, if a party 72 enters a "waiting to engage" status (e.g., by first approaching the service component 24 or by ending a side-conversation and turning toward the service component 24) while the embodiment is already engaged in another interaction 26 with an interaction party 114, the embodiment may acknowledge the party 72 in the waiting state (e.g., "I'll be with you in a moment.") As a third example, if the service component 24 identifies a party 72 that is to be engaged, but if the party 72 is in an unengaged status, the embodiment may solicit the party 72 to engage in an interaction 26.

Other variations of this fourth aspect involving the designation of engagement statuses of various parties 72 involve an assignment of priority to respective interactions 26. Priority may be assigned in many ways, e.g., by order of parties 72 in a queue, by the number or identities of individuals 22 comprising the party 72, or by the anticipated duration of the interaction 26. As a third variation, if multiple parties 72 are identified in a "waiting to engage" status, the party 72 having the highest priority may be selected first for an interaction 26. As a fourth variation, if the service component 24 is engaging a first party 72 (in an "engaged" status) when a second party 72 enters a "waiting to engage" status that has a comparatively higher priority than the first party, the lower priority interaction 26 may be suspended, and the higher priority interaction 26 may be initiated; and when the higher priority interaction 26 concludes, the lower priority interaction 26 may be resumed.

As a fifth example of this fourth aspect, an embodiment of these techniques that manages several interactions 26 may select a particular interaction 26 as an "active" interaction 26 to be engaged, and may suspend the other interactions 26 to be handled later. Accordingly, the embodiment may be equipped with an attention indicator, which may be controlled by the embodiment to indicate the interaction parties 114 of the active interaction 26, in addition to directing the service component 24 to interact with the interaction parties 114 of the active interaction 26. When the active interaction 26 is complete, a second interaction 26 may be selected, and the attention indicator may then indicate the interaction parties 114 thereof. In this manner, the embodiment may signal to the individuals 26 which parties 72 are permitted to interact with the service component 24. As one such example, the embodiment may comprise a display, upon which may be displayed an avatar of the service component 24 (e.g., a visual character representing the service component 24.) The avatar may therefore present a friendly, interactive agent that may perform services on behalf of the parties 72 by interacting with the service component 24. Moreover, the avatar may serve as an attention indicator. For example, if the positions of respective individuals 24 within the scene 92 may be determined, the gaze of the avatar may be directed to focus on an interaction party 114 in order to signal the active interaction 26. This may be achieved by computing a direction from the display to the position of an individual 22 of the interaction party 114, displaying the avatar focusing in the direction of the individual 22. Alternatively or additionally, the avatar may emulate behaviors, e.g., a depiction of nodding while an individual 22 is speaking to indicate that the service component 24 understands the intents and requests of the individual 22. Those of ordinary skill in the art may devise many ways of managing the interactions with the service component 24 while implementing the techniques discussed herein.

Figure 12:
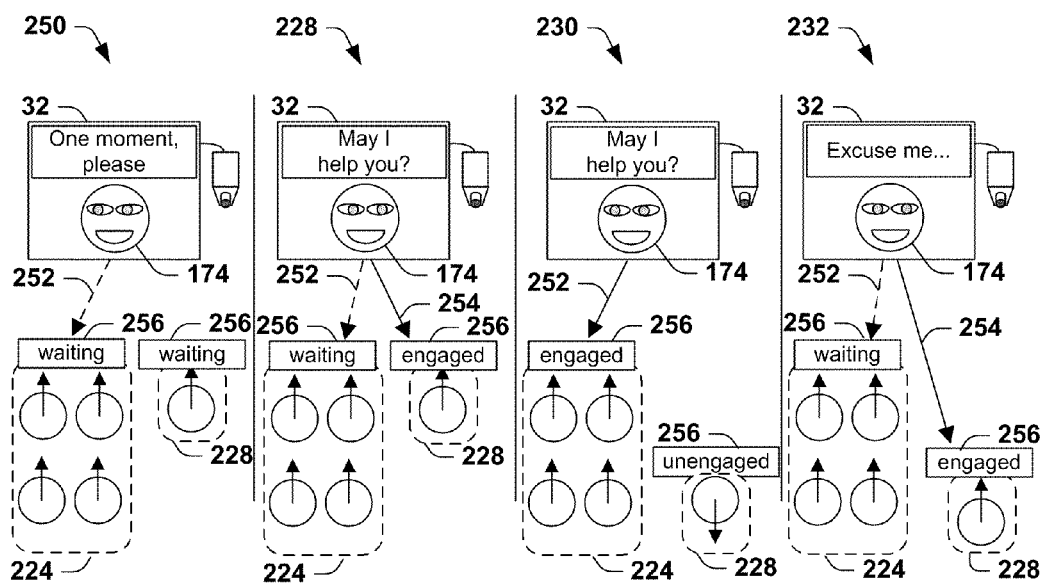
FIG. 12 is an illustration of an exemplary scenario featuring an exemplary system having an attention indicator.

FIG. 12 presents an exemplary scenario featuring an interface 32 to a service component 24 (e.g., an automated host of a restaurant utilizing the exemplary knowledge system 10 of FIG. 1) that incorporates several of these variations. The interface 32 comprises a camera as an input device and a display, whereupon may be rendered an avatar 174 that serves as an intention indicator. The interface 32 is illustrated in a series of interactions at four time points. At a first time point 250, the interface is faced with a first party 224 and a second party 228 that are waiting to engage the interface 32. The interface 32 may assign an interaction status 256 (a "waiting to engage" status) to both parties 72, and may then select one of the parties 72, e.g., by prioritizing the parties based on who approached the interface 32 first, or which interaction 26 may be quicker. The interface 32 may therefore assign a higher priority to the second party 228 (comprising one individual 22) than to the first party 224 (comprising four individuals) based on how quickly the respective parties may be seated. However, instead of ignoring the first party 224, the interface 32 may initiate a first interaction 252 with the first party 224, but may indicate its attention to the first party 224 (by rendering the avatar 174 to "look" at the first party 224), and may suspend the first interaction 252 with a request to wait ("One moment, please.") At a second time point 258, the interface 32 may render the avatar 174 to gaze in the direction of the second party 228, and may engage the second party 228 in a second interaction 254 while maintaining the first interaction 252 in a suspended state. The interface 32 may then conclude the second interaction 254, and at a third time point 260, may choose to resume the suspended first interaction 252 with the first party 224 while the first party 224 waits for the request for a table to be fulfilled (with an "unengaged" interaction status 256.) At a fourth time point 262, the interface 32 may be notified that the table for the second party 228 is ready. The interface 32 may therefore consider this notification a higher-priority interaction 26, and may therefore suspend the first interaction 22 with the first party 224. Moreover, the interface 32 may endeavor to reestablish the second interaction 254 by rendering the avatar 174 to gaze at the second party 228, and by soliciting the second party 228 to interact with the interface 32 ("Excuse me, Mr. Smith, your table is ready . . . ") In this manner, the interface 32 may track the interactions 26 of the parties 72 with the service component 24, and may facilitate managements and selections among such interactions 26.

A fifth aspect that may vary among embodiments of these techniques relates to the coordination of interactions 26 with various interaction parties 114 and individuals 22 associated therewith, such as may be achieved by the interaction coordinating component 196 in the exemplary system 192 of FIG. 10. Once an embodiment has selected a party 72 with whom to initiate an interaction 26, communication may be established with the party 72 that simulates a natural dialogue. As a first variation, the output of the service component 24 may be directed to the interaction parties 114 according to a conversational "turn-taking" approach, wherein an interface 32 detects incoming communications from any interaction party 114 directed to the interface 32, and then provides information (both information generated in response to the input from the interaction parties 114, and new information that is relevant to the interaction 26) during a communication opportunity, such as between periods of incoming communications. Such opportunities may comprise, e.g., periods of silence between vocalizations by the interaction parties 14; periods of inactivity between touchscreen or keyboard input; or periods of stillness between hand gestures, such as by an individual 22 communicating via sign language. In this manner, the interface 32 may avoid interrupting or talking over any individual 22. However, in some scenarios, it may be desirable to interrupt a communicating individual 22, e.g., if urgent or time-sensitive information becomes available that may of significant interest to the individual 22. Therefore, as a second variation, the interface 32 may be configured to recognize high priority information, and to politely interrupt a communicating individual 22 in order to provide the high priority information ("excuse me, but your flight is about to depart . . . ")

As a third variation, an embodiment may be configured to contend with interruptions by various individuals 22, who may or may not be a focus of attention (e.g., a member of an interacting party 114 in an active transaction; a member of another interacting party 114 in another transaction; or a member of a party 72 that is not interacting with the service component 24.) If such interruption occurs during a communication opportunity, such as when the interface 32 is communicating to an individual 24, the interface 32 may be configured to suspend the communications opportunity. Alternatively or additionally, the interface 32 may endeavor to react to the nature of the interruption. For example, a distraction of an interaction party 114 in an active interaction 26 may result in a suspension of the interaction 26, while an interruption of an active interaction 26 by another individual 22 may result in a prioritization of the intent of the interruption (is it an urgent or brief request? does the interrupting individual 22 seem anxious or stressed? etc.) and either a suspension of the active interaction 26 or a deferral of the interruption (e.g., "I'll be with you in just a moment.") Behavioral cues utilized by such individuals 22 may also be emulated; e.g., a full-body depiction of an avatar may be depicted as standing nearer or oriented toward the individual 22 who is the current focus of attention of the service component 24.

As a fourth variation, an embodiment may be configured to direct the output of the service component 24 to different individuals 22, based on the nature of the output. For example, an avatar serving as an attention indicator may be rendered to look at an individual 22 to whom the presented information may relate. In one such embodiment, the party identifying component 104 may endeavor to identify, among the individuals 22 associated with a party 72, a party leader, who may (expressly or implicitly) be designated as the focal point of communication for the party 72. For example, the party leader may be identified as the individual 22 who first interacted with the service component 24, or the individual 22 positioned closest to the service component 24 or centrally aligned with the service component 24. This designation may be used to direct the output of the service component 24; e.g., communications relating to the entire interaction party 114 may be directed to the party leader, while communications relating to a particular individual 22 in the interaction party 114 may be directed to the individual 22. This variation may be useful, e.g., for interacting with large parties 72 of several individuals 22, where it might otherwise be difficult to utilize an attention indicator (e.g., where an avatar 174 is directed to look.)

Figure 13:
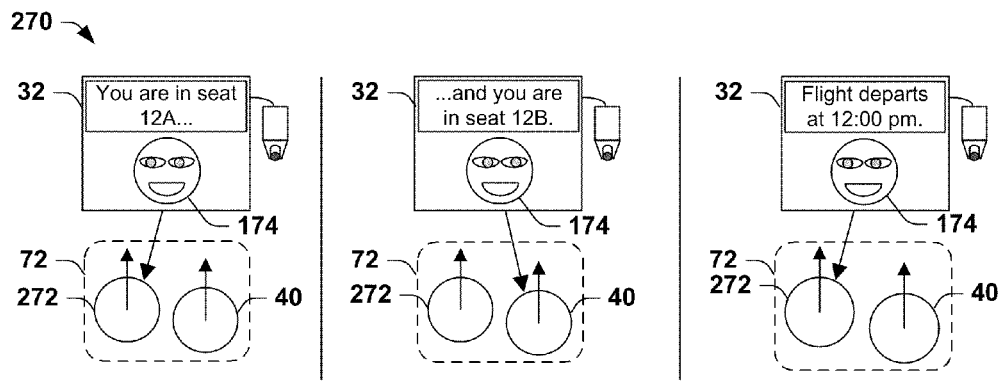
FIG. 13 is an illustration of an exemplary scenario featuring a direction of communications by an attention indicator with a party having a party leader.

FIG. 13 presents an exemplary scenario 270 featuring an application of these techniques, wherein an interface 32 to a service component 24 in an airline check-in scenario may identify a party 72 comprising two individuals 22. However, among the individuals 22, a party leader 272 may be identified as the individual standing closer to the interface 32. As a result, during an identified communication opportunity (e.g., a period of vocal silence from the individuals 22), a first communication individually relating to the party leader 272 (e.g., the seating assignment) may be delivered by rendering an avatar 174 to look at the party leader 272; a second communication relating to the second individual 40 in the party may be delivered by rendering the avatar 174 to look at the second individual 40; and a third communication relating to the entire party 72 may be delivered by looking again at the party leader 272. This exemplary scenario 270 therefore illustrates some techniques for coordinating the interaction 26 of the service component 24 (Through the interface 32) with the individuals 22; however, other interaction coordinating techniques may be devised by those of ordinary skill in the art while implementing the techniques discussed herein.

A sixth aspect that may vary among embodiments of these techniques relates to the identification and use of knowledge of individuals 22 and parties 72 in the context of an interaction 26 (e.g., as may be achieved by the knowledge component 198 of FIG. 10.) As a first variation, many sources of information may be accessed to extract many types of information about various individuals 22. As a first example, information may be identified from various input devices 96. The position of an individual 22 within the scene 92 (e.g., an individual 22 entering a lobby of a secured building from the outside may be an unknown guest, while an individual 22 positioned past a security turnstile may be an authorized visitor or an employee.) Useful information may also be obtained from a visual analysis of an individual 22, such as the dress style of the individual 22 suggestive of a role or employee type, or an audio analysis of the individual 22, such as the degree of stress detected in the voice of the individual 22 suggesting an urgency of an interaction 26. As a second example, various data stores may relate useful information about an individual 22; e.g., a database of known faces may enable an identification of the individual 22.

Figure 14:
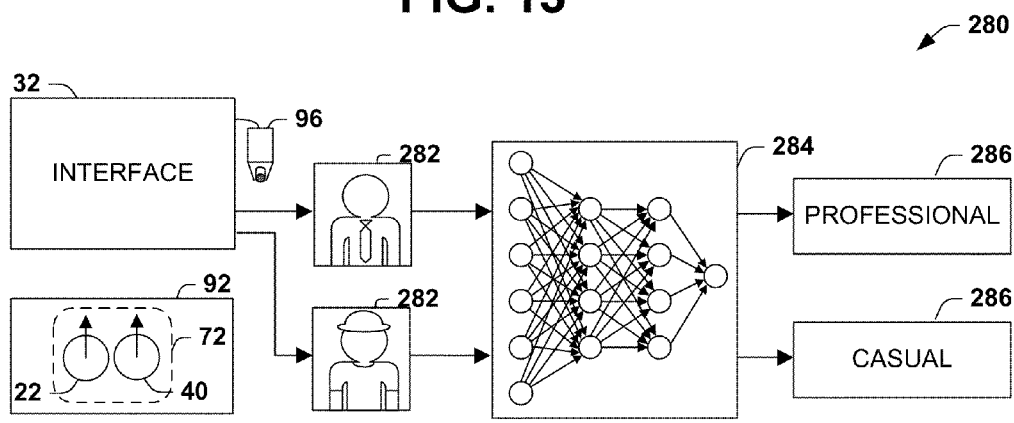
FIG. 14 is an illustration of a learning function configured to identify information items from a scene.

As a third example, a learning function may be used to extract useful information about an individual 22. FIG. 14 illustrates an exemplary scenario 280 featuring an automated classification of various individuals 22 according to the type of dress, as determined by a statistical classification analysis, such as that performed by a neural network, logistic regression, or a Bayesian-network classifier. A classification function 284 may be developed according to such statistical classification analysis and trained with a training data set, such as set of test images 282 of various individuals 22 and an identification of the dress type of the individual 22 (casual, professional, pilot uniform, police, etc.) The classifier function 284 may then be trained on the training data set until it is able to identify the dress type of the test images within an acceptable level of confidence. The classifier function 284 may then be included in an interface 32, which may subsequently capture images 282 (using a camera as an input device 96) of a first individual 22 and a second individual 40 comprising a party 72 in a scene 92. The images 282 may then be provided to the classifier function 284, which may, for respective individuals, identify a dress type 286. The interface 32 may then use the identified dress type 286 to inform the services offered by the interface 32 to each individual. For example, in a hotel setting, the first individual 22 identified in professional attire may be offered business-class services, while the second individual 40 identified in casual attire may be presumed to be a tourist, and may be offered a map of the city and nearby tourist attractions.

Many types of information items may be identified and used in interactions 26 in various ways. One particularly useful set of information that might be identified relates to the intents of the individuals 22, such as a deduced reason for an individual 22 to wish to interact with the service component 24. An embodiment of these techniques may therefore be configured to identify information items regarding the individuals 22 within the scene 92, and to identify at least one intent of an individual 22 within a party 92. For example, an airline kiosk, having identified an individual 22 according to a face-matching algorithm and a lookup in a database of known faces, may attempt to match the identified individual 22 to flight reservations in order to deduce the flight for which the individual 22 is checking in. As a second example, interactions 26 with one or more individuals 22 may be stored to represent an interaction history with the individual 22, and subsequent interactions 26 may be initiated in the context of recently completed interactions 26 with the same individual(s) 22.

Figure 15:
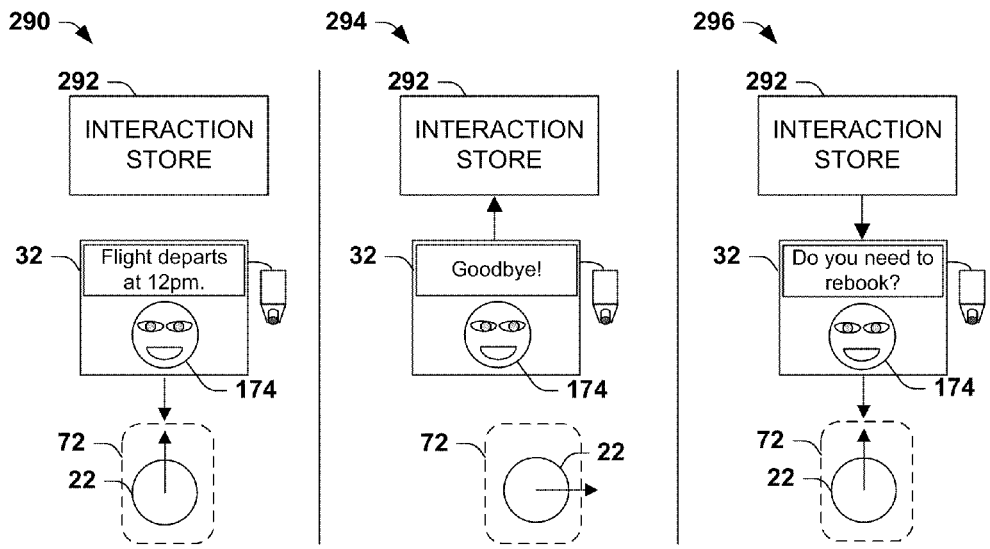
FIG. 15 is an illustration of an exemplary system featuring an interaction store.

FIG. 15 illustrates one such embodiment operating in the context of airline services. An interface 32 may be have to access an interaction store 292, wherein may be stored interaction histories of interactions 26 with various interaction parties 114. For example, at a first time point 290, an individual 22 in a party 72 may interact with an interface 32 (represented by an avatar 174) to check in for a flight. At a second time point 294, the interaction 26 may be complete, and as the individual 22 exits the scene 92, the interface 32 may store in the interaction store 292 an interaction history, which may represent the interaction 26, including at least one intent of one or more individuals 22 in the interaction party 114. However, at a third time point 296, the individual 22 may reappear in the scene 92. The interface 32 may identify the individual 22 (e.g., by matching the face of the individual 22 with a database of known faces), and may begin the interaction 26 with the individual 22 by searching the interaction store 292. Upon finding a record of the recent interaction 26 with the individual 22 in the interaction store 292, the interface 32 may identify the recently checked-in flight, and by comparing the time of the flight with the current time at the third time point 296, may deduce that a problem occurred, and that the individual 22 has not made the flight. The interface 32 may therefore initiate the interaction 26 with the individual 22 based on the recent interaction, e.g., by asking the individual 22 if a flight rebooking is desired. In this manner, the information items identified by an embodiment of these techniques may be used to promote the interaction 26 with individuals 22 and interaction parties 114 and the provision of services by the service component 24. However, those of ordinary skill in the art may devise many ways of extracting and using information regarding various individuals 22 while implementing the techniques discussed herein.

A seventh aspect that may vary among embodiments of these techniques relates to the processing of input from individuals 22 and interaction parties 114, and the delivery of output from the service component 24 into an interaction 26 (e.g., as performed by the conversation component 200 of FIG. 10.) Whereas the coordinating of the interaction 26 may facilitate the protocol for the exchange of information, such as respecting a turn-taking dialogue, the management of the conversation relates to the particular items that are to be communicated, based on the identified information items and intents of the individuals 22 and interaction parties 114. For example, based on a particular intent of an interaction party 114, the conversation may be managed to filter output for relevance based on the intent of the interaction party 114, or may detect and alter redundant output (e.g., instead of asking each individual 22 in an interaction party 114 a set of security questions before boarding a flight, a conversation component 200 of an interface 32 may ask all individuals 22 in the interaction party 114 to respond together, thereby expediting a check-in process.)

As a first variation of this seventh aspect, after identifying the intents of the interaction parties 114 or individuals 22 thereof, an intent prioritizing component may be utilized to compute an intent priority of the intents of the individuals 22 (e.g., among a set of parties 72 with individuals 22 scheduled to board different flights, the intent priority may be based on the chronological proximity of the departure time of each individual's flight.) The service component 24 may then be directed to initiate an interaction 26 with the party 72 whose individuals 22 have a (singularly or averaged) high intent priority. Moreover, the service component 24 may be directed to suspend a lower priority interaction in order to initiate a higher priority interaction 24 with the higher priority interaction party 114, and may resume the lower priority interaction 24 once the higher priority interaction 24 is concluded.

As a second variation of this seventh aspect, a conversation component 200 may support an interaction 26 of a service component 24 with a party 72 of individuals 22 by identifying various tasks that may be related to each intent. For example, a first interaction party 114 may intend to board a flight, and based on this intent, an interface 32 to the service component 24 may identify a first set of tasks for the first interaction party 114, including checking in and checking luggage. A second interaction party 114 may intend to book a flight for a later trip, and the interface 32 may identify a set of tasks including searching for qualifying flights for the second interaction party 114 and booking a reservation. The interface 32 may therefore initiate an interaction 26 with one of the interaction parties 114, and may, upon completing the tasks identified for each intent of the interaction party 114 or the individuals therein, detect a conclusion of the interaction 26 and begin a new interaction. Those of ordinary skill in the art may devise many configurations of a conversation component while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 16:
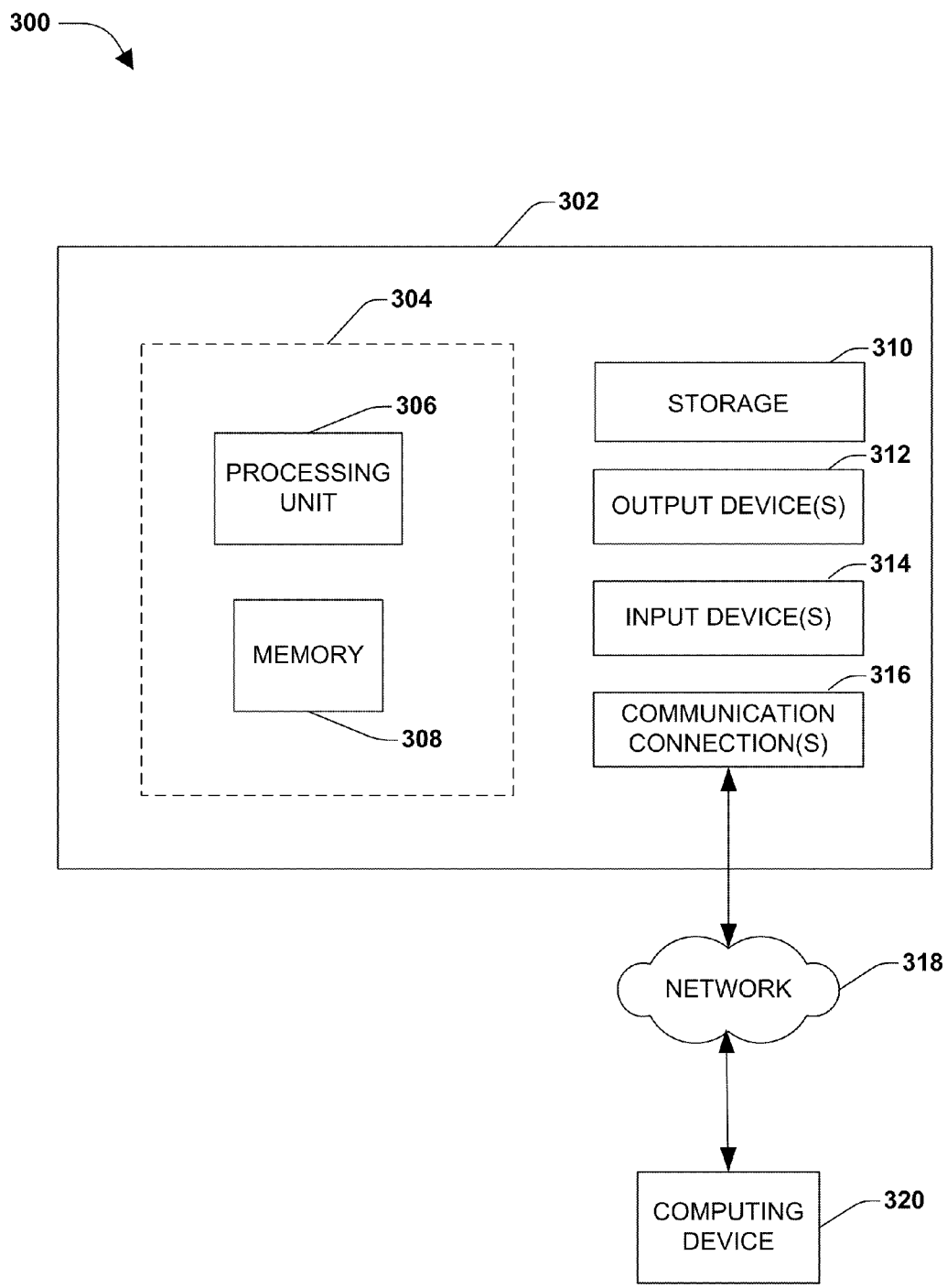
FIG. 16 illustrates an exemplary computing environment wherein one or more of the provisions set forth herein may be implemented.

FIG. 16 and the following discussion provide a brief, general description of a suitable computing environment to implement embodiments of one or more of the provisions set forth herein. The operating environment of FIG. 16 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 16 illustrates an example of a system 300 comprising a computing device 302 configured to implement one or more embodiments provided herein. In one configuration, computing device 302 includes at least one processing unit 306 and memory 308. Depending on the exact configuration and type of computing device, memory 308 may be volatile (such as RAM, for example), non-volatile (such as ROM, flash memory, etc., for example) or some combination of the two. This configuration is illustrated in FIG. 16 by dashed line 304.

In other embodiments, device 302 may include additional features and/or functionality. For example, device 302 may also include additional storage (e.g., removable and/or non-removable) including, but not limited to, magnetic storage, optical storage, and the like. Such additional storage is illustrated in FIG. 16 by storage 310. In one embodiment, computer readable instructions to implement one or more embodiments provided herein may be in storage 310. Storage 310 may also store other computer readable instructions to implement an operating system, an application program, and the like. Computer readable instructions may be loaded in memory 308 for execution by processing unit 306, for example.

The term "computer readable media" as used herein includes computer storage media. Computer storage media includes volatile and nonvolatile, removable and non-removable media implemented in any method or technology for storage of information such as computer readable instructions or other data. Memory 308 and storage 310 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 302. Any such computer storage media may be part of device 302.

Device 302 may also include communication connection(s) 316 that allows device 302 to communicate with other devices. Communication connection(s) 316 may include, but is not limited to, a modem, a Network Interface Card (NIC), an integrated network interface, a radio frequency transmitter/receiver, an infrared port, a USB connection, or other interfaces for connecting computing device 302 to other computing devices. Communication connection(s) 316 may include a wired connection or a wireless connection. Communication connection(s) 316 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 302 may include input device(s) 314 such as keyboard, mouse, pen, voice input device, touch input device, infrared cameras, video input devices, and/or any other input device. Output device(s) 312 such as one or more displays, speakers, printers, and/or any other output device may also be included in device 302. Input device(s) 314 and output device(s) 312 may be connected to device 302 via a wired connection, wireless connection, or any combination thereof. In one embodiment, an input device or an output device from another computing device may be used as input device(s) 314 or output device(s) 312 for computing device 302.

Components of computing device 302 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 302 may be interconnected by a network. For example, memory 308 may be comprised of multiple physical memory units located in different physical locations interconnected by a network.

Those skilled in the art will realize that storage devices utilized to store computer readable instructions may be distributed across a network. For example, a computing device 320 accessible via network 318 may store computer readable instructions to implement one or more embodiments provided herein. Computing device 302 may access computing device 320 and download a part or all of the computer readable instructions for execution. Alternatively, computing device 302 may download pieces of the computer readable instructions, as needed, or some instructions may be executed at computing device 302 and some at computing device 320.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system configured to manage interactions of a service component with at least one party within a scene on a device having a processor, the system comprising:
    a party identifying component configured to associate at least two individuals present within the scene with at least one party; and
    an interaction tracking component configured to:
        track at least one interaction with at least one interaction party;
        for respective interactions with the at least one individual of at least one interaction party:
            receive communications from individuals of the at least one interaction party, and
            direct the service component in communicating to the at least one interaction party; and upon detecting a higher priority interaction having a high priority during a lower priority interaction having a lower priority:
suspend the lower priority interaction;
after suspending the lower priority interaction, initiate the higher priority interaction; and
upon concluding the higher priority interaction, resume the lower priority interaction.

2. The system of claim 1, comprising:
at least one input component configured to:
receive input pertaining to at least one of the individuals, and
deliver the input to the party identifying component; and
at least one output component configured to:
receive output from the interaction tracking component to be delivered to at least one of the individuals associated with at least one party, and
render the output to the at least one individual.

3. The system of claim 2, comprising:
at least one physical resource to be regulated by the service component, and
at least one automation component configured to control the physical resource according to the service component.

4. The system of claim 3:
the physical resource comprising a door;
the automation component comprising a motor operable to open the door and to permit the door to close; and
the service component comprising a door opening component configured to:
upon detecting at least one interaction party intending to pass through the door, open the door; and
between detected interaction parties intending to pass through the door, close the door.

5. The system of claim 1, the interaction tracking component comprising:
an interaction establishing component configured to track interactions established between individuals associated with respective interaction parties and the service component;
an interaction coordinating component configured to, for respective interactions, coordinate communications of the service component with the individuals of the at least one interaction party;
a knowledge component configured to identify information items regarding the individuals within the scene; and
a conversation component configured to, for respective interactions, deliver output from the service component into the interaction to at least one individual of the at least one interaction party.

6. The system of claim 1:
the party identifying component configured to, for respective individuals, identify a behavior of the individual within the scene; and
the party identifying component configured to associate individuals with parties according to the behavior of the individual relative to the behaviors of individuals associated with the party.

7. The system of claim 1, tracking the interaction with the individuals of respective interaction parties comprising: identifying an engagement state of respective individuals with the service component, the engagement state selected from a set of engagement states comprising:
an unengaged state,
an engaged state, and
a waiting to engage state.

8. The system of claim 7, the directing the service component comprising:
upon detecting a first individual associated with at least one party in a waiting to engage state while no party is in an engaged state, initiating an interaction with the individual in the waiting to engage state; and
upon detecting a second individual associated with at least one party in a waiting to engage state while the first individual is in an engaged state, acknowledging the second individual in the waiting to engage state.

9. The system of claim 1:
the system comprising an attention indicator configured to indicate at least one individual of at least one interaction party involved in an active interaction; and
directing the service component comprising:
among at least one interaction, selecting an active interaction;
indicating the at least one individual of the at least one interaction party to the active interaction via the attention indicator; and
directing the service component to interact with the at least one individual of the at least one interaction party to the active interaction.

10. The system of claim 9:
the party identifying component configured to, for respective individuals within the scene, identify a position of the individual within the scene;
the system comprising a display;
the attention indicator comprising an avatar of the service component displayed on the display; and
the indicating the at least one interaction party comprising:
computing a direction from the display to the position of at least one individual of the at least one interaction party, and
displaying the avatar focusing in the direction of the at least one individual.

11. The system of claim 1:
the party identifying component configured to identify, among the individuals of a party, a party leader; and
the directing the service component comprising: for respective interaction parties to the interaction:
for communications relating to the interaction party, directing the service component to interact with the party leader of the interaction party; and
for communications relating to an individual associated with the interaction party, directing the service component to interact with the party leader of the interaction party.

12. The system of claim 1, the directing the service component comprising:
detecting at least one incoming communication to the service component from at least one individual of an interaction party, and
between incoming communications, identifying communication opportunities to communicate to the at least one individual of the at least one interaction party.

13. The system of claim 12, the directing the service component comprising: upon detecting an interruption of a communication opportunity by an individual of an interaction party, suspending the communication opportunity.

14. The system of claim 1, the interaction tracking component configured to:
identify information items regarding individuals within the scene, and
identify from the information items at least one intent of at least one individual of the party.

15. The system of claim 14:
the system comprising an interaction store configured to store interaction histories of interactions with interaction parties;
the interaction tracking component configured to:
upon detecting a conclusion of an interaction with at least one interaction party, store an interaction history representing the interaction in the interaction store, the interaction history comprising at least one intent of at least one individual of the at least one interaction party; and
upon initiating an interaction with at least one individual of at least one interaction party:
search the interaction store for a recent interaction with least one of the interaction parties, and
upon finding a recent interaction, initiate the interaction based on the recent interaction.

16. The system of claim 14:
the system comprising an intent prioritizing component configured to compute an intent priority of respective intents of the individuals; and
the directing the service component comprising: among at least one interaction, selecting an interaction among the individuals of at least one interaction party with at least one individual having a high intent priority.

17. The system of claim 14, the directing the service component comprising: upon identifying at least one intent of at least one individual of a party:
identifying at least one task relating to the at least one intent;
initiating an interaction with the at least one individual of the at least one party; and
upon completing the tasks relating to the at least one intent of the at least one individual of the interaction party, concluding the interaction.

18. A computer-readable storage device storing instructions that, when executed on a processor of a computer, manage interactions of a service component with at least one party within a scene by:
associating at least two individuals present within the scene with at least one party;
tracking at least one interaction with at least one individual of at least one interaction party; and
for respective interactions with at least one individual of at least one interaction party:
receiving communications from individuals of the at least one interaction party;
directing the service component in communicating to the at least one individual of the at least one interaction party; and
upon detecting a higher priority interaction having a high priority during a lower priority interaction having a lower priority:
suspending the lower priority interaction;
after suspending the lower priority interaction, initiating the higher priority interaction; and
upon concluding the higher priority interaction, resuming the lower priority interaction.

19. The computer-readable storage device of claim 18, further comprising instructions that, when executed on a processor of a computer, manage interactions of a service component with at least one party within a scene by:
tracking interactions established between the at least one individual of respective interaction parties and the service component;
for respective interactions, coordinating communications with individuals of the at least one interaction party;
identifying information items regarding the individuals within the scene; and
for respective interactions, delivering output into the interaction to at least one individual of the at least one interaction party.

20. A system configured to manage interactions of a service component with at least two parties within a scene on a device having a processor, the system having access to:
at least one input device configured to detect input from the scene;
at least one output component including a display comprising an attention indicator configured to indicate at least one individual of at least one interaction party to an active interaction; and
an interaction store configured to store interaction histories of interactions with interaction parties;
and the system comprising:
a party identifying component comprising an individual recognition component configured to:
associate at least two individuals present within the scene with at least one party according to the contextual indicator of the individual relative to the contextual indicators of the individuals associated with the party;
for the individuals of respective parties, a contextual indicator of the individual within the scene; and
identify, among the at least two individuals of a party, a party leader; and
an interaction tracking component comprising:
an interaction establishing component configured to track interactions established between the individuals of respective interaction parties and the service component by:
identifying an engagement state of respective individuals with the service component, the engagement state selected from a set of engagement states comprising:
an unengaged state,
an engaged state, and
a waiting to engage state;
upon detecting at least one party in a waiting to engage state while no party is in an engaged state, initiating an interaction with at least one individual of the interaction party in a waiting to engage state;
upon detecting at least one individual of at least one party in a waiting to engage state while an interaction party is in an engaged state, acknowledging the at least one individual in the waiting to engage state;
upon detecting a higher priority interaction with at least one individual of at least one interaction party, the at least one individual having a high intent priority during a lower priority interaction:
suspending the lower priority interaction,
after suspending the lower priority interaction, initiating the higher priority interaction, and
upon concluding the higher priority interaction, resuming the lower priority interaction;
upon initiating an interaction with at least one individual of at least one interaction party:
searching the interaction store for a recent interaction with least one of the interaction parties, and
upon finding a recent interaction, initiating the interaction based on the recent interaction; and
upon detecting a conclusion of an interaction with at least one individual of at least one interaction party, storing an interaction history representing the interaction in the interaction store, the interaction history comprising at least one intent of at least one individual of the at least one interaction party;
an interaction coordinating component configured to, for respective interactions, coordinate communications of the service component with the individuals of the at least one interaction party by:
  detecting at least one incoming communication to the service component from at least one individual of an interaction party,
  between incoming communications, identifying communication opportunities to communicate to at least one individual of the at least one interaction party, and
  upon detecting an interruption of a communication opportunity by an individual of an interaction party, suspending the communication opportunity;
a knowledge component configured to:
  identify information items regarding individuals within the scene,
  identify from the information items at least one intent of at least one individual of the party,
  compute an intent priority of respective intents of the individuals, and
  identify at least one task relating to the at least one intent;
a conversation component configured to, for respective interactions, deliver output from the service component into the interaction by:
  among at least one interaction, selecting an active interaction;
  for communications relating to the interaction party, directing the service component to interact with the party leader of the at least one interaction party;
  for communications relating to an individual of the interaction party, directing the service component to interact with the individual; and
  indicating the individual by:
    computing a direction from the display to the position of the individual within the scene, and
    displaying on the display an avatar focusing in the direction of the individual; and
  upon completing the tasks relating to the at least one intent of the at least one individual of the interaction party, concluding the interaction.

* * * * *

UNITED STATES PATENT AND TRADEMARK OFFICE
CERTIFICATE OF CORRECTION

PATENT NO. : 8,473,420 B2  
APPLICATION NO. : 12/492812  
DATED : June 25, 2013  
INVENTOR(S) : Dan Bohus et al.

Page 1 of 1

It is certified that error appears in the above-identified patent and that said Letters Patent is hereby corrected as shown below:

In the Specification

In column 8, line 31, after "instead?")" insert -- . --.

In column 9, line 5, after "FIG. 3.)" and insert -- . --, therefor.

In column 17, line 4, after "speak?")" insert -- . --.

In the Claims

In column 31, line 15, In Claim 15, delete "least" and insert -- at least --, therefor.

In column 32, line 62, In Claim 20, delete "least" and insert -- at least --, therefor.

Signed and Sealed this
Twenty-fourth Day of February, 2015

Michelle K. Lee
*Deputy Director of the United States Patent and Trademark Office*